(12) United States Patent
Shibasaki

(10) Patent No.: US 8,200,994 B2
(45) Date of Patent: Jun. 12, 2012

(54) IMAGE PROCESSING APPARATUS OPERABLE USING MULTIPLE CLOCKS

(75) Inventor: Jumpei Shibasaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 589 days.

(21) Appl. No.: 12/372,036

(22) Filed: Feb. 17, 2009

(65) Prior Publication Data

US 2009/0213125 A1 Aug. 27, 2009

(30) Foreign Application Priority Data

Feb. 22, 2008 (JP) ................................ 2008-041985

(51) Int. Cl.
*G06F 1/00* (2006.01)
(52) U.S. Cl. ......... 713/300; 713/322; 713/323; 713/320
(58) Field of Classification Search .......... 713/300–340; 345/501
See application file for complete search history.

(56) References Cited

U.S. PATENT DOCUMENTS

| | | | |
|---|---|---|---|
| 6,782,482 B2 * | 8/2004 | Nishizawa | 713/320 |
| 6,963,340 B1 * | 11/2005 | Alben et al. | 345/501 |
| 7,500,122 B2 * | 3/2009 | Won et al. | 713/320 |
| 7,634,668 B2 * | 12/2009 | White et al. | 713/300 |
| 7,653,825 B1 * | 1/2010 | White et al. | 713/322 |
| 7,886,164 B1 * | 2/2011 | Alben et al. | 713/300 |
| 7,903,116 B1 * | 3/2011 | Klock et al. | 345/501 |
| 8,060,761 B2 * | 11/2011 | Lai et al. | 713/300 |
| 2001/0022671 A1 * | 9/2001 | Itoh | 358/448 |
| 2005/0120144 A1 * | 6/2005 | Koyama | 710/8 |
| 2007/0196083 A1 * | 8/2007 | Yamamoto et al. | 396/48 |
| 2009/0044037 A1 * | 2/2009 | Park et al. | 713/400 |
| 2011/0060928 A1 * | 3/2011 | Khodorkovsky et al. | 713/323 |

FOREIGN PATENT DOCUMENTS

JP 06-118836 A 4/1994

* cited by examiner

*Primary Examiner* — Raymond Phan
(74) *Attorney, Agent, or Firm* — Marvin A. Motsenbocker; Mots Law, PLLC

(57) ABSTRACT

An aspect of the invention provides an image processing apparatus that processes image data on the basis of received data, the image processing apparatus comprising: a CPU operatable on multiple CPU clocks; a selecting unit configured to select a first CPU clock on the basis of an operation mode of the image processing apparatus and processing state information on the image processing apparatus; and a changing unit configured to change a second CPU clock to the first CPU clock selected by the selecting unit.

23 Claims, 17 Drawing Sheets

FIG. 2

| SIGNAL STATE ||||SETTING MODE|
|---|---|---|---|---|
| RECEIVED SIGNAL | OUTPUT START SIGNAL | OUTPUT TERMINATION SIGNAL | FIXING DEVICE TEMPERATURE SIGNAL | |
| RISE | – | – | H LEVEL | HIGH SPEED MODE |
| RISE | – | – | L LEVEL | SWITCHING UNNECESSARY |
| – | RISE | – | – | HIGH SPEED MODE |
| – | – | RISE | – | LOW SPEED MODE |

FIG. 3

| SETTING MODE | SWITCHING CONTROL SIGNAL | SET FREQUENCY |
|---|---|---|
| HIGH SPEED MODE | H LEVEL | 1000MHz |
| LOW SPEED MODE | L LEVEL | 500MHz |

FIG. 12

| PARAMETER | PDL | | GRADATION AND RESOLUTION | | HOST INTERFACE | | |
|---|---|---|---|---|---|---|---|
| | PS | PCL | 2bit 600dpi x 600dpi | 5bit 600dpix1200dpi | CENTRO Rs-232c | USB FULL LAN 10/100 | USB HIGH G-LAN |
| LOAD POINT | 2 | 0 | 0 | 5 | 0 | 1 | 2 |

FIG. 13

| JOB IDENTIFICATION INFORMATION | TOTAL LOAD POINT |
|---|---|
| PRINT JOB 1 | 3 |
| PRINT JOB 2 | 4 |
| PRINT JOB 3 | 6 |

FIG. 14

| SIGNAL STATE | | | | GRAND TOTAL LOAD POINT | SETTING MODE |
|---|---|---|---|---|---|
| RECEIVED SIGNAL / EDITING TERMINATION SIGNAL | OUTPUT START SIGNAL | OUTPUT TERMINATION SIGNAL | FIXING DEVICE TEMPERATURE SIGNAL | | |
| RISE | – | – | H LEVEL | – | HIGH SPEED MODE |
| RISE | – | – | L LEVEL | 11~ | HIGH SPEED MODE |
| RISE | – | – | L LEVEL | 5~10 | MEDIUM SPEED MODE |
| RISE | – | – | L LEVEL | 0~4 | LOW SPEED MODE |
| – | RISE | – | – | – | HIGH SPEED MODE |
| – | – | RISE | – | – | LOW SPEED MODE |

FIG. 15

| SETTING MODE | SWITCHING CONTROL SIGNAL | SET FREQUENCY |
|---|---|---|
| HIGH SPEED MODE | H LEVEL | 1000MHz |
| MEDIUM SPEED MODE | H LEVEL | 700MHz |
| LOW SPEED MODE | L LEVEL | 500MHz |

FIG. 20

| JOB IDENTIFICATION INFORMATION | PDL | GRADATION AND RESOLUTION | HOST INTERFACE | TOTAL LOAD POINT |
|---|---|---|---|---|
| PRINT JOB 1 | PS | 2bit · 600dpi x 600dpi | USB-FULL | 3 |
| PRINT JOB 2 | PS | 2bit · 600dpi x 600dpi | G-LAN | 4 |
| PRINT JOB 3 | PCL | 5bit · 600dpi x 1200dpi | LAN 10 / 100 | 6 |

IMAGE PROCESSING APPARATUS OPERABLE USING MULTIPLE CLOCKS

CROSS REFERENCE TO RELATED APPLICATIONS

This application claims priority based on 35 USC 119 from prior Japanese Patent Application No. P2008-041985 filed on Feb. 22, 2008, entitled "Image Processing Apparatus", the entire contents of which are incorporated herein by reference.

BACKGROUND OF THE INVENTION

1. Field of the Invention

The present invention relates to an image processing apparatus that performs image processing on inputted image data, and particularly, to an image processing apparatus having an energy saving function.

2. Description of Related Art

Typically, an energy saving function has been included in image processing apparatus, such as printers, copying machines, facsimile apparatus, scanner devices, and multi-function machines. The energy saving function causes the image processing apparatus to shift to a power saving state when a predetermined time passes after powering on or completion of a printing job and the next printing job is not executed, i.e., at the time of printing standby.

For example, Japanese Patent Application Publication No. Hei 6-118836 discloses a technique for decreasing the image processing apparatus power consumption by stopping power to a fixing device at the time of printing standby.

In recent years, further reduction of the power consumption is required in such an image processing apparatus. For example, an image processor, such as a controller board on which a CPU is mounted, has an edit-output function to perform editing of video data of an image to be printed, and to output the video data to an image formation unit. For that reason, the image processor is a component that consumes much power, as well as the above-mentioned fixing device. However, sufficient power saving measures for the image processor have not been taken in the conventional arts. There has been almost no difference between the power consumed by the image processor during printing standby and that during the edit-output processing execution, thereby wasting power.

SUMMARY OF THE INVENTION

An aspect of the invention provides an image processing apparatus that processes image data on the basis of received data, the image processing apparatus comprising: a CPU operatable on multiple CPU clocks; a selecting unit configured to select a first CPU clock on the basis of an operation mode of the image processing apparatus and processing state information on the image processing apparatus; and a changing unit configured to change a second CPU clock to the first CPU clock selected by the selecting unit.

According to the above-mentioned image processing apparatus, since the CPU clock is changed based on the operation mode and processing state of the image processing apparatus, power consumption by the CPU during standby can be reduced.

Another aspect of the invention provides an image processing apparatus that processes image data on the basis of received data, the image processing apparatus comprising: an input unit configured to receive image data; an edit-output unit comprising a CPU operable on multiple frequencies, the edit-output unit configured to edit the image data received to generate video data, and output the video data; a formation unit configured to form an image on a medium based on the video data output; and a frequency changing unit configured to change an operation frequency of the CPU based on the processing status of the formation unit.

BRIEF DESCRIPTION OF THE DRAWINGS

FIG. 2 is an explanatory view showing an example of a determination table of Embodiment 1;

FIG. 3 is an explanatory view showing an example of a setting information table of Embodiment 1;

FIG. 12 is an explanatory view showing an example of a load information table;

FIG. 13 is an explanatory view showing an example of a job information storage unit;

FIG. 14 is an explanatory view showing an example of a determination table of Embodiment 2;

FIG. 15 is an explanatory view showing an example of a setting information table of Embodiment 2;

FIG. 20 is an explanatory view showing an example of calculation of a total load point of a print job.

DETAILED DESCRIPTION OF EMBODIMENTS

Figure 1:
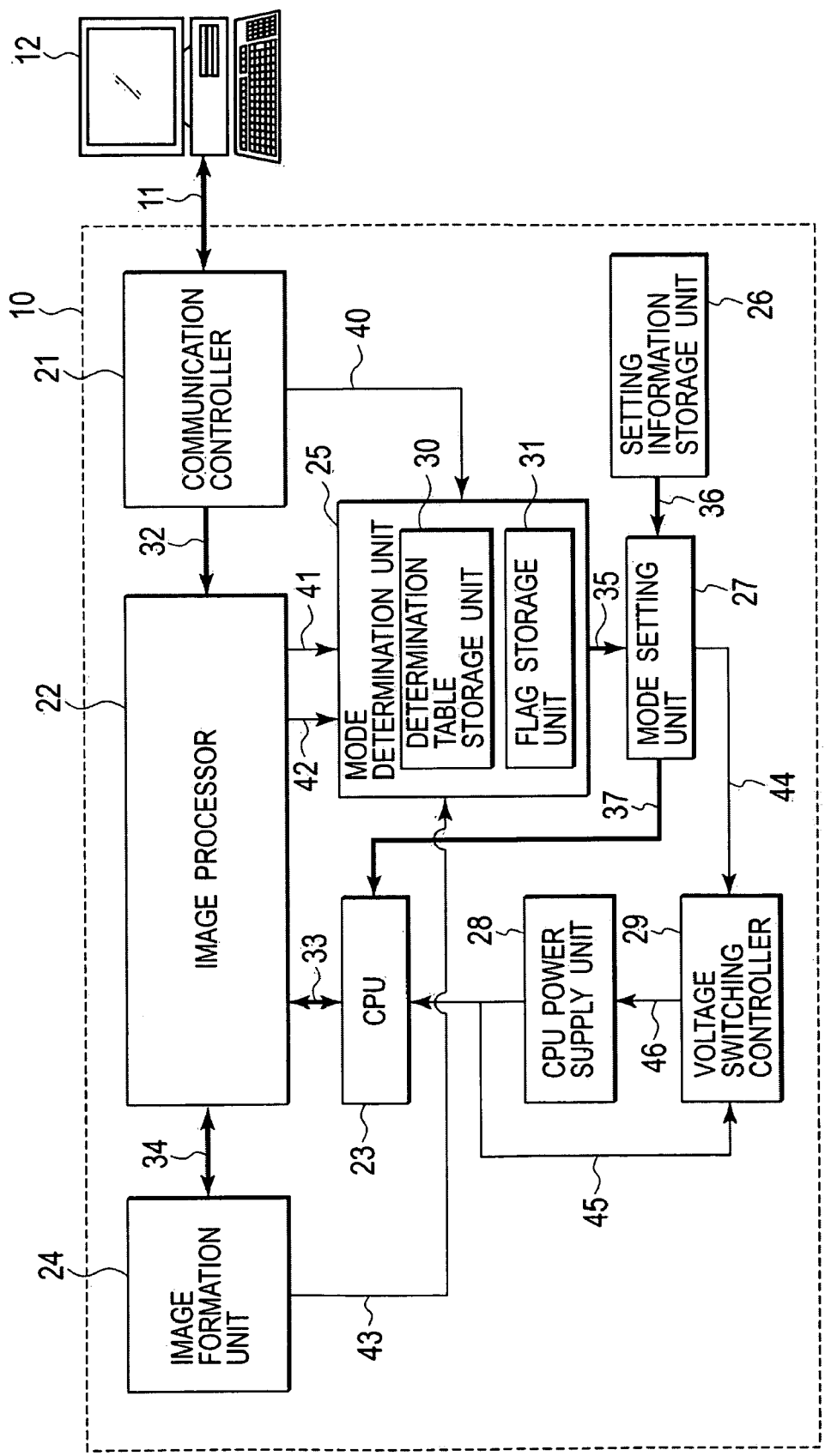
FIG. 1 is a block diagram showing a configuration of a printer according to Embodiment 1.

Hereinafter, embodiments will be described, referring to the drawings. Same reference numerals will be given to elements common in the drawings. While as an example of an image forming apparatus an electrophotographic printer with an energy saving function will be described, the present invention is not limited to this, and can be implemented in many ways.

[Embodiment 1]

FIG. 1 is a block diagram showing a configuration of a printer according to Embodiment 1.

As shown in FIG. 1, printer 10 according to the embodiment is connected to personal computer 12 through communication line 11. Printer 10 receives a print job including image data from personal computer 12, and performs printing processing.

As shown in FIG. 1, printer 10 serves as an image processing apparatus, and comprises communication controller 21, image processor 22, CPU 23, image formation unit 24, mode determination unit 25, setting information storage unit 26, mode setting unit 27, CPU power supply unit 28, and voltage switching controller 29.

Communication controller 21 includes host interfaces such as to a network and a USB port, and is connected to personal computer 12 through communication line 11. As a receiver, communication controller 21 receives the print job including the image data from personal computer 12. Communication controller 21 is also connected to image processor 22 through bus signal line 32 to output the received print job to image processor 22. Moreover, communication controller 21 outputs an interrupt signal I-INT that indicates reception of the print job into mode determination unit 25. Hereinafter, interrupt signal I-INT that is outputted by communication controller 21 into mode determination unit 25 is referred to as received signal 40.

As an edit-output unit, image processor 22 reads the image data from the print job input by communication controller 21 and performs image processing, such as gray level correction and dithering, on the image data. Then, image processor 22 generates rasterized video data, and subsequently, outputs the video data to image formation unit 24. Hereinafter, the processing from input of the print job to generation of the video data in image processor 22 is referred to as input editing process, and the processing of outputting the video data to image formation unit 24 is referred to as output process. Image processor 22 is connected to CPU 23 through bus signal line 33.

When starting output of the video data to image formation unit 24, image processor 22 outputs interrupt signal PS-INT that indicates start of output into mode determination unit 25. When output of the video data to image formation unit 24 is terminated, image processor 22 outputs interrupt signal PE-INT that indicates termination of output into mode determination unit 25. Interrupt signal PS-INT and interrupt signal PE-INT, which are output by image processor 22 into mode determination unit 25 are referred to as output start signal 41 and output termination signal 42, respectively.

CPU 23 controls image processor 22, and is connected to image processor 22 through bus signal line 33. CPU 23 can operate at different clock frequencies, and the mode in which CPU 23 operates is referred to as an operation mode. CPU 32 has a high speed operation mode in which CPU 32 operates at a higher frequency, and a low speed operation mode in which CPU 32 operates at a lower frequency. The high speed operation mode consumes more power than the low speed operation mode. In this embodiment, CPU 23 can operate at an operating voltage $V_{CPU}$ of 1.26 V to 1.5 V and at operating frequency $f_{CPU}$ of 500 MHz to 1000 MHz, and operates in either the low speed operation mode or high speed operation mode. However, is not limited to these two types of operation mode. For example, CPU 32 may have three types, four types, or more types of operation mode. The operation mode of CPU 23 is set by mode setting unit 27. CPU 23 operates at a low voltage of $V_{CPU}=1.26$ V and at a low frequency of $f_{CPU}=500$ MHz in the low speed operation mode, and operates at a high voltage of $V_{CPU}=1.5$ V and at a high frequency $f_{CPU}=1000$ MHz in the high speed operation mode.

Image formation unit 24 comprises a print head, various drums, a fixing device, a transfer device, a power supply, or the like, which are not shown, and is connected to image processor 22 through bus signal line 34. Image formation unit 24 performs printing processing on a print medium on the basis of the video data inputted from image processor 22. In this embodiment, image formation unit 24 is provided with a power saving mode wherein, when image formation unit 24 does not perform the printing processing for more than a specified period of time, power supply to the fixing device is stopped in response to an instruction from image processor 22.

Additionally, a temperature sensor is installed within the fixing device in image formation unit 24 to sense the surface temperature of the fixing roller. Image formation unit 24 outputs TTL level control signal FT into mode determination unit 25. The TTL level control signal FT is a notification signal for notification of the temperature of the fixing device detected by the temperature sensor, and is referred to as fixing device temperature signal 43 below. Here, image formation unit 24 outputs an H level signal as fixing device temperature signal 43 when the fixing device temperature is within a range of ±20 degrees C. relative to predetermined fixing target temperature $T_c$, and outputs an L level signal as fixing device temperature signal 43 when the fixing device temperature is out of the range of $T_c$±20 degree C. Fixing target temperature $T_c$ is an optimal temperature for fixing a toner image onto the print medium, and is determined based on the temperature, humidity, or the like of the inside of printer 10.

Mode determination unit 25 contains determination table storage unit 30. As a judging unit and a determination unit, mode determination unit 25 determines a setting mode on the basis of a determination table stored in determination table storage unit 30 when the interrupt signal is input from communication controller 21 or image processor 22. Here, the setting mode indicates the operation mode to be set in CPU 23.

FIG. 2 is an explanatory view showing an example of the determination table of Embodiment 1.

As shown in FIG. 2, setting mode information is set in the determination table in advance. Setting mode information indicates the setting mode and corresponds to signal states of the interrupt signal and control signal that are input from each unit.

For example, in the determination table indicated in FIG. 2, the setting mode information "high speed mode" is stored in association with the signal state "rise" of received signal 40, and the signal state "H level" of fixing device temperature signal 43, while the setting mode information "switching unnecessary" is stored in association with the signal state "rise" of received signal 40 and the signal state "L level" of fixing device temperature signal 43. This indicates that mode determination unit 25 determines the setting mode depending on a signal level of fixing device temperature signal 43 input from image formation unit 24 when received signal 40 is input from communication controller 21. In other words, when fixing device temperature signal 43 is the H level signal, mode determination unit 25 determines that the setting mode is the high speed mode. On the other hand, when fixing device temperature signal 43 is the L level signal, mode determination unit 25 determines that the operation mode need not be switched.

Moreover, in the determination table shown in FIG. 2, the setting mode information "high speed mode" is stored in association with the signal state "rise" of output start signal 41, while the setting mode information "low speed mode" is stored in association with the signal state "rise" of output termination signal 42. This indicates that mode determination unit 25 determines that the setting mode is the high speed mode when receiving output start signal 41 from image processor 22, and determines that the setting mode is the low speed mode when receiving output termination signal 42.

Mode determination unit 25 also contains flag storage unit 31 as a storage unit. Flag information that indicates the current operation mode of CPU 23 is stored in flag storage unit 31. The flag information is "H" when the operation mode of CPU 23 is the high speed mode, and is "L" when the operation mode is the low speed mode.

After determining the setting mode on the basis of the input signal and the determination table (FIG. 2), mode determination unit 25 reads the flag information from flag storage unit 31 to determine whether or not the setting mode and the operation mode coincide with each other. When determining that the setting mode and the operation mode do not coincide, mode determination unit 25 notifies mode setting unit 27 of the setting mode information in order to change the operation mode of CPU 23 to the determined setting mode. As an updating unit, mode determination unit 25 also updates the flag information stored in flag storage unit 31.

Setting information storage unit 26 is connected to mode setting unit 27 through bus signal line 36, and stores a setting information table.

FIG. 3 is an explanatory view showing an example of the setting information table of Embodiment 1.

As shown in FIG. 3, in the setting information table, setting information comprises switching control signal information and set frequency information and is stored in association with each piece of the setting mode information. The switching control signal information indicates a signal level of switching control signal VC 44 output by mode setting unit 27, the signal level being either an "H level" or "L level". This switching control signal VC 44 is a signal output to voltage switching controller 29 to control operating voltage $V_{CPU}$ of CPU 23. The set frequency information indicates operating frequency $f_{CPU}$ of CPU 23, which is switched according to the setting mode.

For example, in the setting information table shown in FIG. 3, the switching control signal information "H level" and the set frequency information "1000 MHz" are stored in association with the setting mode information "high speed mode". Moreover, the switching control signal information "L level" and the set frequency information "500 MHz" are stored in association with the setting mode information "low speed mode".

Mode setting unit 27 is connected to mode determination unit 25 through bus signal line 35, and is connected to setting information storage unit 26 through bus signal line 36. Mode setting unit 27 is also connected to CPU 23 through bus signal line 37, and, as a frequency switching unit, switches operating frequency $f_{CPU}$ of CPU 23.

When notified by mode determination unit 25 of setting mode information having either the low speed mode or the high speed mode, mode setting unit 27 reads setting information corresponding to the setting mode information from the setting information table (FIG. 3) of setting information storage unit 26. Then, mode setting unit 27 writes set frequency information included in the thus-read setting information into an internal register of CPU 23 to change operating frequency $f_{CPU}$. Based on switching control signal information included in the thus-read setting information, mode setting unit 27 switches the signal level of the switching control signal VC 44 to be output to voltage switching controller 29.

When notified by mode determination unit 25 of the setting mode information "high speed mode", mode setting unit 27 switches switching control signal VC 44 to the H level signal on the basis of the switching control signal information "H level" read from the setting information table (FIG. 3). Simultaneously, mode setting unit 27 changes operating frequency $f_{CPU}$ of CPU 23 to 1000 MHz on the basis of the set frequency information "1000 MHz".

When notified by mode determination unit 25 of the setting mode information "low speed mode", mode setting unit 27 switches switching control signal VC 44 to the L level signal on the basis of the switching control signal information "L level" read from the setting information table (FIG. 3), and simultaneously, changes operating frequency $f_{CPU}$ of CPU 23 to 500 MHz on the basis of the set frequency information "500 MHz".

CPU power supply unit 28 is a power circuit formed of a DC-DC controller or the like. In response to supply of power from a power supply unit of printer 10 not shown, CPU power supply unit 28 sets the power level according to a rating of CPU 23 and outputs operating voltage $V_{CPU}$ to CPU 23. CPU power supply unit 28 also has a feedback function to adjust output voltage $V_{CPU}$ to hold constant output voltage $V_{ref}$ 46 from voltage switching controller 29.

As a voltage switching unit, voltage switching controller 29 outputs voltage $V_{ref}$ 46 to CPU power supply unit 28 to switch operating voltage $V_{CPU}$ of CPU 23 on the basis of switching control signal VC 44 input from mode setting unit 27. In the embodiment, output voltage $V_{ref}$ 46 from voltage switching controller 29 is 0.75 V.

Figure 4:
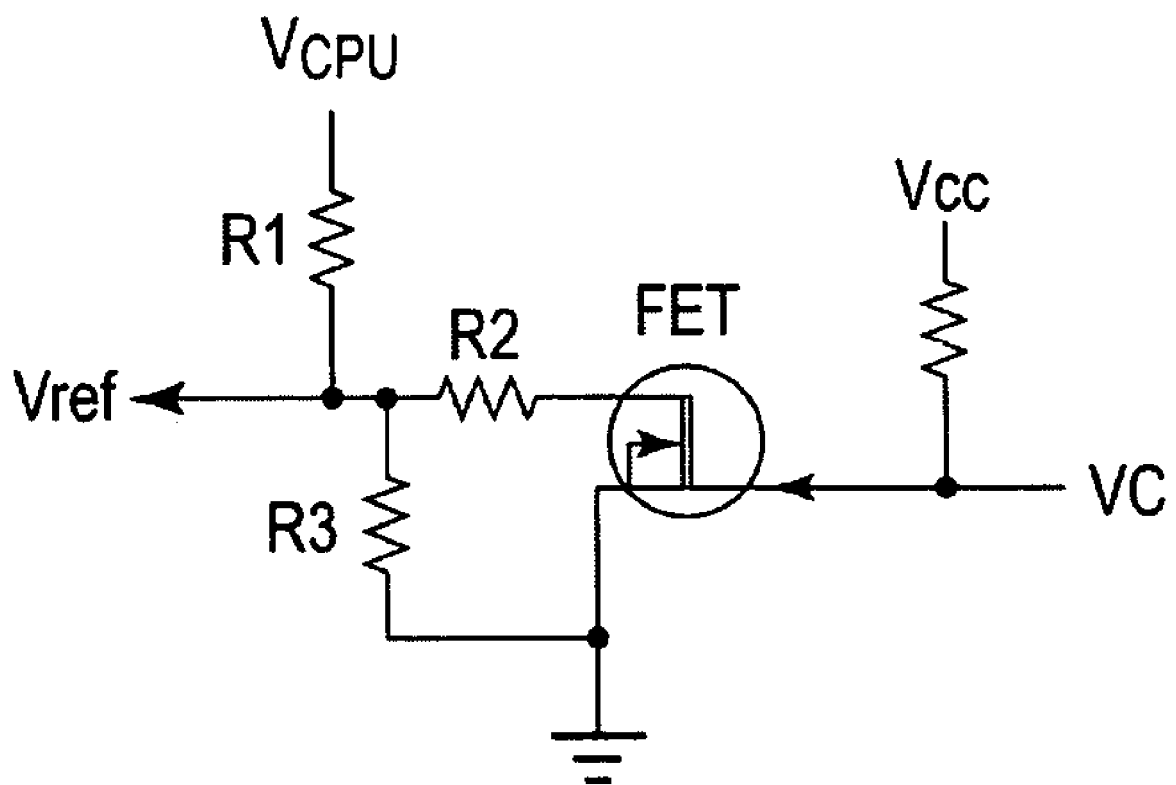
FIG. 4 is a circuit diagram showing a configuration of a voltage switching controller.

FIG. 4 is a circuit diagram showing a configuration of voltage switching controller 29.

As shown in FIG. 4, voltage switching controller 29 includes resistances R1, R2, and R3, and an FET. The voltage level of operating voltage $V_{CPU}$ 45 supplied to CPU 23 is controlled by controlling values of resistance values $R_1$, $R_2$ and $R_3$ of resistances R1, R2, and R3 and a current that flows into the FET.

For example, when the H level signal is input as switching control signal VC 44 from mode setting unit 27 into voltage switching controller 29, the FET operates, and a current flows into resistance R2. Therefore, operating voltage $V_{CPU}$ is expressed by an equation $V_{CPU}=V_{ref}\times(1+R_1/R_{23})$, where $R_{23}$ is a combined resistance value of resistances R2 and R3 and $R_{23}=R_2\times R_3/(R_2+R_3)$.

On the other hand, when the L level signal is input as switching control signal VC 44 from mode setting unit 27 into voltage switching controller 29, the FET stops, and the current does not flow into resistance R2. Therefore, operating voltage $V_{CPU}$ is expressed by an equation $V_{CPU}=V_{ref}\times(1+R_1/R_2)$.

In the embodiment, resistance values $R_1$, $R_2$ and $R_3$ of resistances R1, R2, and R3 included in voltage switching controller 29 are respectively 1.5 kΩ, 4.7 kΩ, and 2.2 kΩ. Here, when operating voltage $V_{CPU}$ is calculated based on the above-mentioned equations, $V_{CPU}$=1.5 V when switching control signal VC 44 is the H level signal, and $V_{CPU}$=1.26 V when switching control signal VC 44 is the L level signal.

Generally, little current flows into a CMOS transistor circuit like the CPU except when a change occurs in a circuit signal in synchronization with clock timing. Therefore, the power consumption of the CPU is reduced in proportion to the decrease of the operating frequency and operating voltage of the CPU. In CPU 23 of the embodiment, when the operation mode is changed from the high speed mode to the low speed mode, operating voltage $V_{CPU}$ drops by 16% from a high voltage of 1.5 V to a low voltage of 1.26 V, and operating frequency $f_{CPU}$ drops by 50% from a high frequency of 1000 MHz to a low frequency of 500 MHz. Operating frequency $f_{CPU}$ has an influence on the power consumption only at the time of switching. Therefore, assuming that this influence is estimated to be a half from dropping by 50% from a high frequency to a low frequency, i.e., 25%, the power consumption is reduced to 0.84×0.75×100=63% by switching the operation mode of CPU 23 from the high speed mode to the low speed mode. Therefore, when the power consumption of CPU 23 in the high speed mode is 10 W, the power consumption in the low speed mode is 6.3 W.

Next, operation of printer 10 according to the embodiment will be described.

Here, the flow of processing in printer 10 will be described when image processor 22 executes the input editing processing and the output processing on the print job received from personal computer 12, and simultaneously, mode determination unit 25 executes determination and switching of the operation mode.

When the power is switched on, printer 10 starts power supply to the fixing device, and heats the fixing roller within the fixing device. Simultaneously, printer 10 operates CPU 23 in the high speed mode to shift to a printable state in a short time. Subsequently, when a printing job is not executed for a specified period of time, printer 10 stops power supply to the fixing device, switches CPU 23 to the low speed mode, and shifts to a printing standby state.

Referring to the flow charts shown in FIGS. 5 and 6, description will be given of a flow of processing performed when print job 1 and print job 2 are sequentially received from personal computer 12, with printer 10 in the printing standby state.

Figure 5:
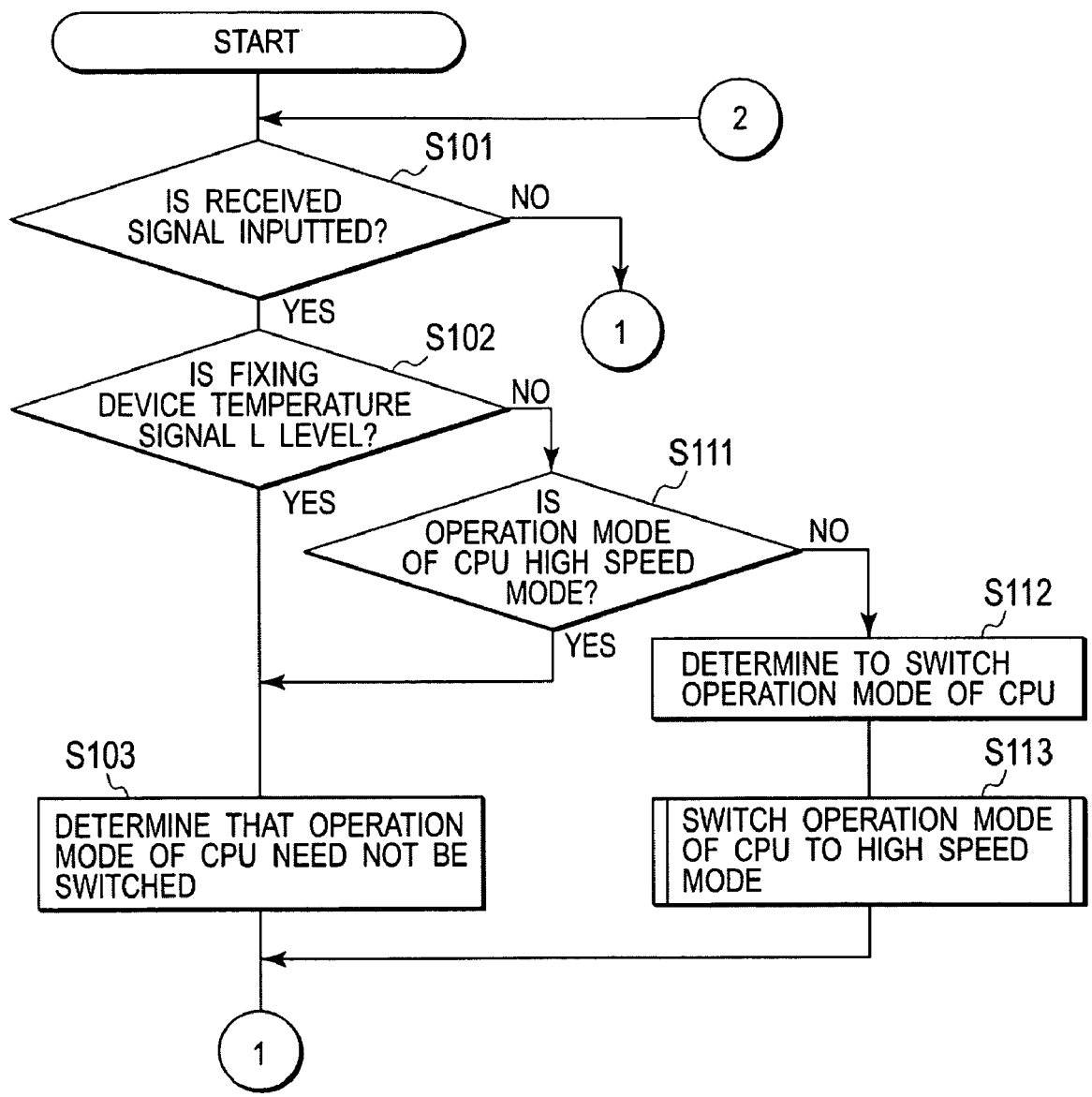
FIG. 5 is a first flow chart showing print operation of Embodiment 1.
Figure 6:
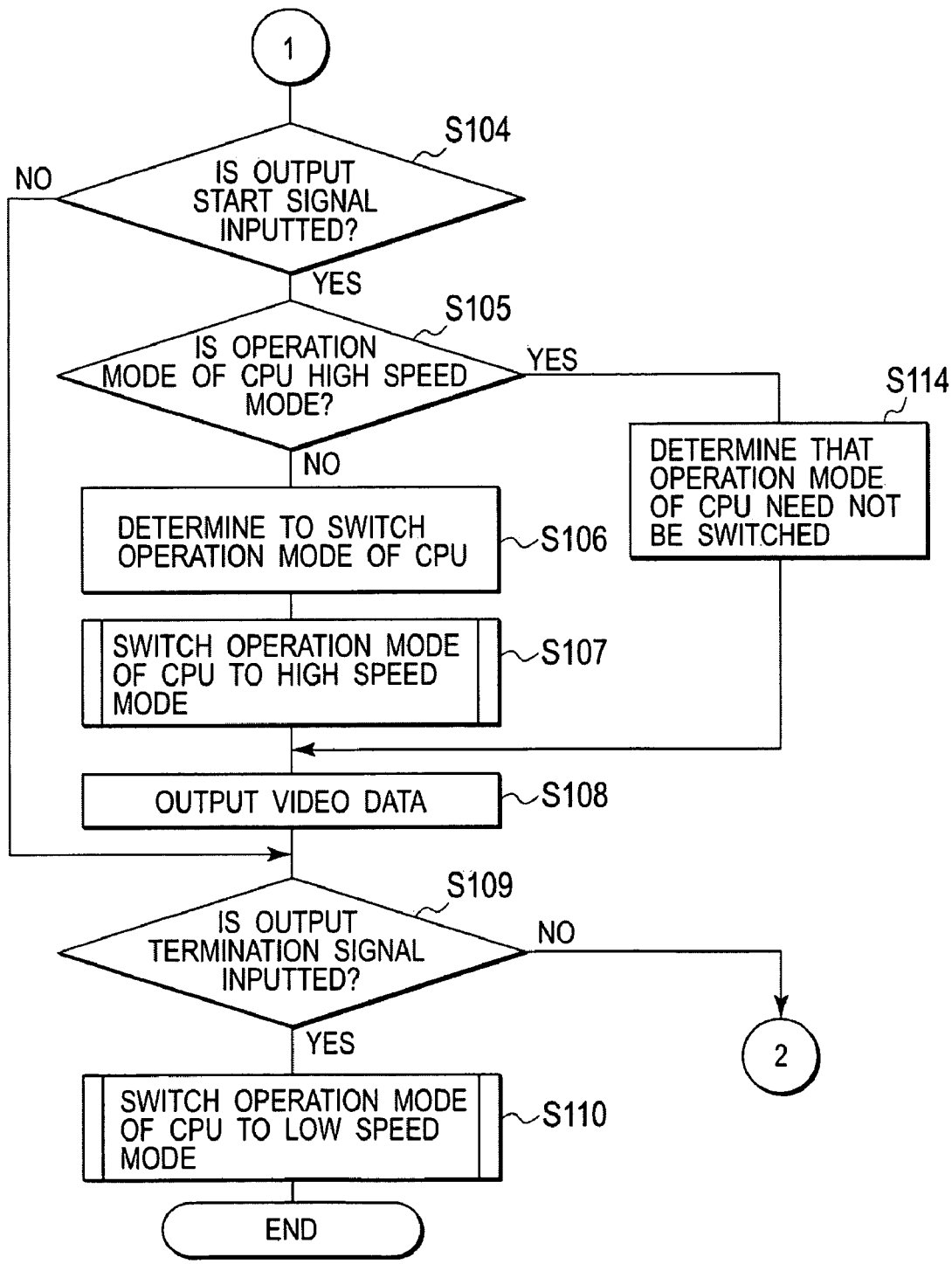
FIG. 6 is a second flow chart showing print operation of Embodiment 1.

FIG. 5 is a first flow chart showing print operation of Embodiment 1 of the printer according to the invention, and FIG. 6 is a second flow chart showing the print operation of Embodiment 1 of the printer according to the invention.

First, along with the above-mentioned flow charts and a time chart shown in FIG. 7, description will be given, as an example, of a case where the fixing device temperature of image formation unit 24 is out of the range of $T_c \pm 20$ degrees C. upon reception of print job 1 and print job 2, or in other words, when the fixing device temperature is far from fixing target temperature $T_c$ and it takes some time to bring image formation unit 24 into the printable state.

Figure 7:
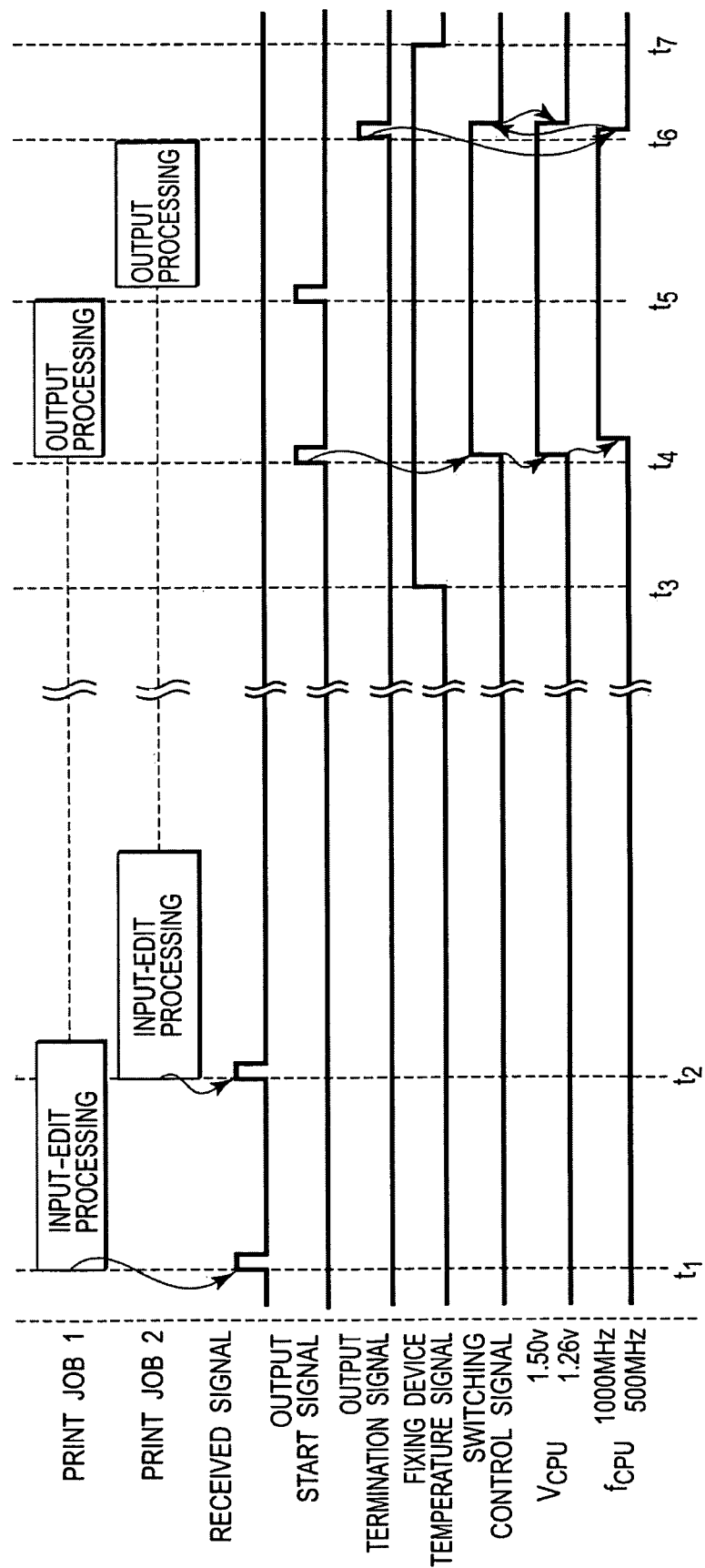
FIG. 7 is a first time chart showing the print operation of Embodiment 1.

FIG. 7 is a first time chart showing the print operation of Embodiment 1 of the printer according to the invention.

In FIG. 7, symbols $t_1$ to $t_7$ shown below indicate time.

When print job 1 is sent from personal computer 12 and received by printer 10, communication controller 21 outputs received print job 1 to image processor 22, and outputs received signal 40 that indicates reception of the print job.

Image processor 22 starts the input editing processing on the print job 1 in response to input of print job 1 by communication controller 21. A start time of this input editing processing is $t_1$ (FIG. 7). Image processor 22 also resumes power supply to the fixing device to bring image formation unit 24 into the printable state.

Synchronizing with start of the input editing processing on print job 1 by image processor 22 ($t_1$ (FIG. 7)), received signal 40 is input into mode determination unit 25 from communication controller 21 (Step S101). In response to input of received signal 40, mode determination unit 25 determines, based on the determination table (FIG. 2) stored in determination table storage unit 30, whether or not fixing device temperature signal 43 input from image formation unit 24 is the L level signal, to determine whether or not to switch the operation mode (Step S102).

Image formation unit 24 has output, as fixing device temperature signal 43, the L level signal indicating that the fixing device temperature is out of the range $T_c \pm 20$ degrees C. (FIG. 7). Therefore, mode determination unit 25 determines that fixing device temperature signal 43 is the L level signal (Step S102).

When determining that the fixing device temperature is the L level signal (Step S102), mode determination unit 25 determines, based on the determination table (FIG. 2), that the operation mode of CPU 23 need not be switched (Step S103).

Print job 2 is sent to printer 10 from personal computer 12 while image processor 22 is executing the input editing processing on print job 1. Upon receipt of print job 2, communication controller 21 outputs print job 2 to image processor 22, and also outputs received signal 40.

Image processor 22 starts the input editing processing on print job 2 in response to input of print job 2 by communication controller 21 ($t_2$ (FIG. 7)).

Synchronizing with start of the input editing processing on print job 2 by image processor 22 ($t_2$ (FIG. 7)), received signal 40 is input into mode determination unit 25 from communication controller 21 (Step S101). As is similar to the case of print job 1, mode determination unit 25 determines the signal level of fixing device temperature signal 43 (Step S102), and determines whether or not to switch the operation mode (Step S103). Mode determination unit 25 determines that the operation mode of CPU 23 need not be switched (Step S103).

Upon termination of input editing processing on print job 1 and print job 2, image processor 22 generates video data for each print job. Subsequently, in image formation unit 24, when the fixing device temperature reaches a temperature within the range of fixing target temperature $T_c \pm 20$ degrees C., fixing device temperature signal 43 output from image formation unit 24 becomes the H level signal. This time is shown as $t_3$ in FIG. 7. When fixing device temperature signal 43 output from image formation unit 24 becomes the H level signal, and further, a predetermined time passes, the fixing device temperature reaches fixing target temperature $T_c$, so that image formation unit 24 is brought into the printable state. Upon shift to the printing possible state, image processor 22 outputs output start signal 41 ($t_4$ (FIG. 7)).

Upon receipt of output start signal 41 from image processor 22 (Step S104), mode determination unit 25 determines, based on the determination table (FIG. 2), that the setting mode is the high speed mode. Subsequently, in order to determine whether or not to switch the operation mode, mode determination unit 25 reads the flag information from flag storage unit 31, and determines whether or not the operation mode of CPU 23 is the high speed mode (Step S105).

Here, the operation mode of CPU 23 is the low speed mode, and the flag information "L" is stored in flag storage unit 31. When reading the flag information "L", mode determination unit 25 determines that the operation mode is the low speed mode, i.e., not the high speed mode (Step S105). Then, mode determination unit 25 determines that the operation mode and the setting mode do not coincide, in other words, that the operation mode needs to be switched (Step S106).

Based on this determination, mode determination unit 25 updates the flag information of flag storage unit 31 to "H", and simultaneously, notifies mode setting unit 27 of the setting mode information "high speed mode". Then, mode setting unit 27 executes processing to switch the operation mode of CPU 23 to the high speed mode (Step S107). The processing by mode setting unit 27 to switch the operation mode from the low speed mode to the high speed mode will be described in detail later.

When the processing by mode setting unit 27 to switch the operation mode is terminated, image processor 22 sequentially outputs the video data generated based on print job 1 page by page (Step S108). Then, image formation unit 24 executes printing processing on a print medium on the basis of the inputted video data. Since CPU 23 is in the high speed mode at the time of execution of the output processing by image processor 22, the video data is continuously inputted into image formation unit 24 in accordance with a conveying speed of the print medium. Therefore, the output processing and printing processing of each page are sequentially executed.

When output of the video data corresponding to print job 1 is terminated, image processor 22 outputs output start signal 41 to start output of the video data corresponding to print job 2 ($t_5$ (FIG. 7)). Upon receipt of output start signal 41 (Step S104), mode determination unit 25 reads the flag information "H" from flag storage unit 31, and determines that the operation mode of CPU 23 is the high speed mode (Step S105). Then, mode determination unit 25 determines that the operation mode need not be switched (Step S114).

Then, image processor 22 outputs the video data corresponding to print job 2 (Step S108). When output of all the video data generated and accumulated is terminated, image processor 22 outputs output termination signal 42 ($t_6$ (FIG. 7)).

When output termination signal 42 is input into mode determination unit 25 from image processor 22 (Step S109), in order to switch the operation mode of CPU 23 to the low speed mode on the basis of determination table (FIG. 2), mode determination unit 25 updates the flag information of flag storage unit 31 to "L", and notifies mode setting unit 27 of the setting mode information "low speed mode". Then, mode setting unit 27 executes the processing to switch the operation mode of CPU 23 to the low speed mode (Step S110). This switching processing from the high speed mode to the low speed mode will be also described in detail later.

Then, upon completion of the printing processing based on the video data in image formation unit 24, the printing job in printer 10 is terminated. When the specified period of time passes after termination of the printing job, power supply to the fixing device is stopped, and printer 10 shifts to the printing standby state. Fixing device temperature signal 43 output from image formation unit 24 is switched from the H level signal to the L level signal when the fixing device temperature falls to $T_c$−20 degrees C. ($t_7$ (FIG. 7)).

As mentioned above, when the print job is received with printer 10 in the printing standby state, image processor 22 performs the input editing processing while the operation mode of CPU 23 is maintained in the low speed mode. Then, the operation mode of CPU 23 is switched to the high speed mode along with start of output of the video data to image formation unit 24.

Figure 8:
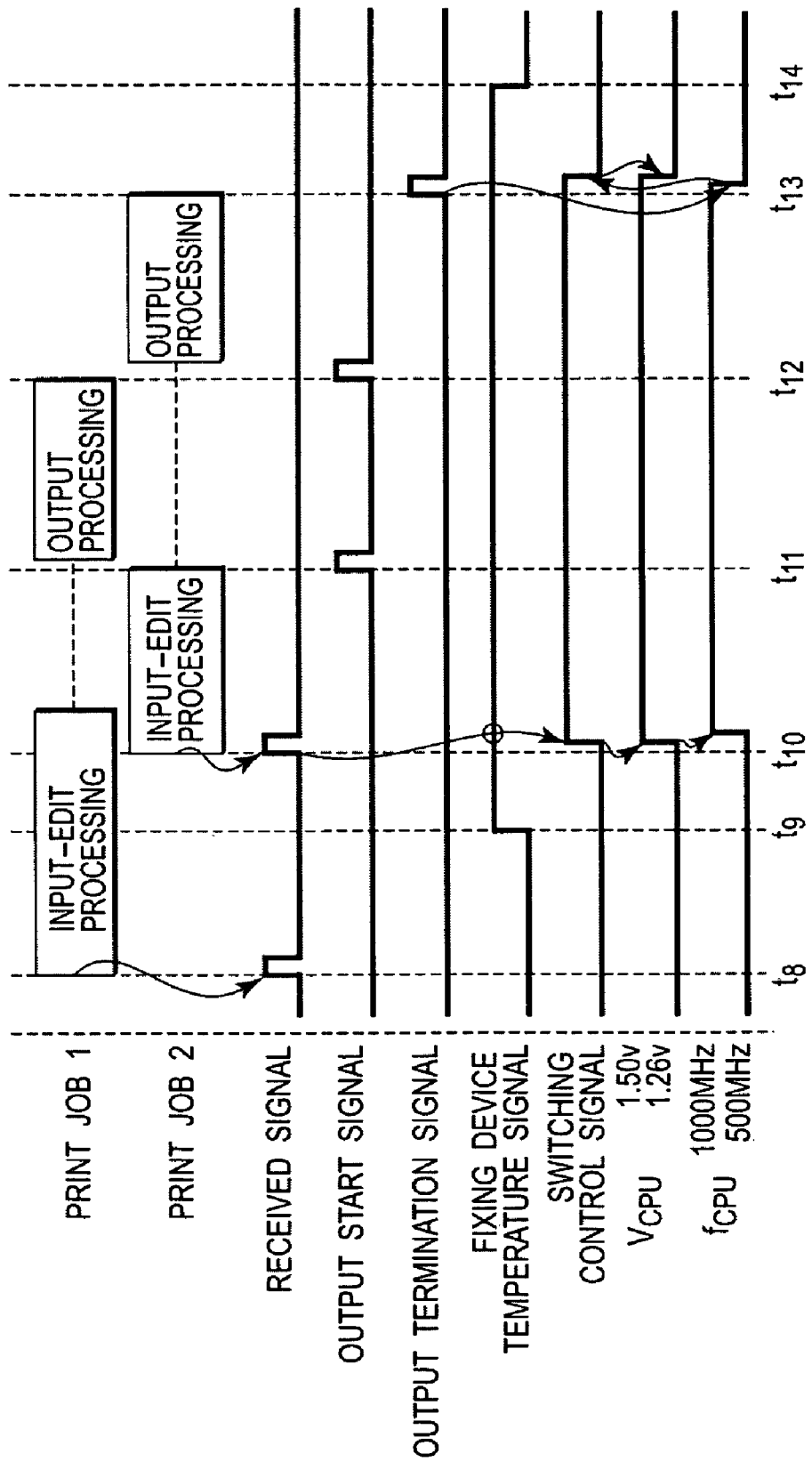
FIG. 8 is a second time chart showing the print operation of Embodiment 1.

Next, with the flow charts of FIGS. 5 and 6, and a time chart shown in FIG. 8, description will given of, as an example, a case where the fixing device temperature of image formation unit 24 is out of the range of $T_c$±20 degrees C. upon reception of print job 1, but reaches the temperature within the range of $T_c$±20 degrees C. upon reception of print job 2, in other words, when the fixing device temperature is closer to fixing target temperature $T_c$, and image formation unit 24 is in the printable state or in a state close to the printable state.

FIG. 8 is a second time chart showing operation of Embodiment 1 of the printer according to the invention. In FIG. 8, symbols $t_8$ to $t_{14}$ shown below indicate time.

In printer 10, image processor 22 starts the input editing processing in response to input of print job 1 from communication controller 21 ($t_8$ (FIG. 8)). Image processor 22 also resumes power supply to the fixing device to bring image formation unit 24 into the printable state.

When received signal 40 is inputted from communication controller 21 upon start of the input editing processing (Step S101), mode determination unit 25 determines, based on the determination table (FIG. 2), whether or not fixing device temperature signal 43 inputted from image formation unit 24 is the L level signal, to determine whether or not to switch the operation mode (Step S102).

Since fixing device temperature signal 43 is the L level signal in time $t_8$ (FIG. 8), mode determination unit 25 determines that fixing device temperature signal 43 is the L level signal (Step S102), and determines that the operation mode of CPU 23 need not be switched (Step S103).

When the fixing device temperature reaches within the range of $T_c$±20 degrees C. during execution of the input editing processing on print job 1 in image processor 22, image formation unit 24 switches fixing device temperature signal 43 to the H level signal. This time is shown as $t_9$ in FIG. 8.

Next, print job 2 is outputted from communication controller 21, and the input editing processing on print job 2 is started in image processor 22. This time is shown as $t_{10}$ in FIG. 8. Here, $t_9 < t_{10}$. Simultaneously with start of the input editing processing, received signal 40 from communication controller 21 is inputted into mode determination unit 25 (Step S101).

Based on input of received signal 40, mode determination unit 25 determines whether or not fixing device temperature signal 43 is the L level signal, to determine whether or not to switch the operation mode (Step S102). Since fixing device temperature signal 43 is already switched to the H level signal (FIG. 8), mode determination unit 25 determines that fixing device temperature signal 43 is the H level signal, i.e., not the L level signal (Step S102).

Next, mode determination unit 25 reads the flag information from flag storage unit 31 to determine whether or not the operation mode of CPU 23 is the high speed mode (Step S111).

When the read flag information is "H", mode determination unit 25 determines that the operation mode is the high speed mode (Step S111). Since the setting mode information "high speed mode" is stored in the determination table (FIG. 2) in association with the signal state of received signal 40 "rise" and the signal state of fixing device temperature signal 43 "H level", mode determination unit 25 determines that the setting mode and the operation mode coincide, namely, that the operation mode of CPU 23 need not be switched (Step S103).

When the read flag information is "L", mode determination unit 25 determines that the operation mode is the low speed mode (Step S111), and determines that the operation mode and the setting mode do not coincide, namely, that the operation mode needs to be switched (Step S112). Mode determination unit 25 updates the flag information of flag storage unit 31 to "H", and simultaneously, notifies mode setting unit 27 of the setting mode information "high speed mode". Then, mode setting unit 27 executes the processing to switch the operation mode to the high speed mode (Step S113).

Since image formation unit 24 is brought into the printable state when the input editing processing on print job 1 and print job 2 is terminated in image processor 22, image processor 22 outputs output start signal 41 ($t_{11}$ (FIG. 8)).

Upon receipt of output start signal 41 from image processor 22 (Step S104), mode determination unit 25 reads the flag information from flag storage unit 31 to determine whether or not to switch the operation mode, and determines whether or not the operation mode of CPU 23 is the high speed mode (Step S105). Here, since CPU 23 is already switched to the high speed mode (FIG. 8), the flag information "H" is stored in flag storage unit 31. Therefore, mode determination unit 25 determines that the operation mode is the high speed mode (Step S105), and determines that the operation mode need not be switched (Step S114).

Then, image processor 22 sequentially outputs the video data page by page on the basis of print job 1 (Step S108), and image formation unit 24 executes the printing processing on a print medium on the basis of the inputted video data. After output of the video data corresponding to print job 1 is terminated, image processor 22 outputs output start signal 41 in order to start output of the video data corresponding to print job 2 ($t_{12}$ (FIG. 8)).

Upon receipt of output start signal 41 (Step S104), mode determination unit 25 reads the flag information "H" from flag storage unit 31, determines that the operation mode of CPU 23 is the high speed mode (Step S105), and determines that the operation mode need not be switched (Step S114). Then, image processor 22 outputs the video data corresponding to print job 2 (Step S108). Subsequently, when output of all the video data generated and accumulated is terminated, image processor 22 outputs output termination signal 42 ($t_{13}$ (FIG. 8)).

Upon receipt of output termination signal 42 from image processor 22 (Step S109), mode determination unit 25 updates the flag information of flag storage unit 31 to "L" to switch the operation mode of CPU 23 to the low speed mode, and simultaneously, notifies mode setting unit 27 of the setting mode information "low speed mode". Then, mode setting unit 27 executes the processing to switch the operation mode of CPU 23 to the low speed mode (Step S110), so that the printing job in printer 10 is terminated. When the specified period of time passes after termination of the printing job, power supply to the fixing device is stopped, and printer 10 shifts to the printing standby state. Fixing device temperature signal 43 outputted from image formation unit 24 is switched from the H level signal to the L level signal when the fixing device temperature falls to $T_c$–20 degrees C. ($t_{14}$ (FIG. 8)).

As mentioned above, when the print job is newly received after image formation unit 24 is brought into the printing possible state, printer 10 switches CPU 23 to the high speed mode, and executes the input editing processing by image processor 22.

Next, operation of switching the operation mode of CPU 23 in printer 10 will be described.

First, with a flow chart shown in FIG. 9, description will be given of a flow of processing performed when the operation mode of CPU 23 is switched from the low speed mode to the high speed mode (Step S107 (FIG. 6) and Step S113 (FIG. 5)).

Figure 9:
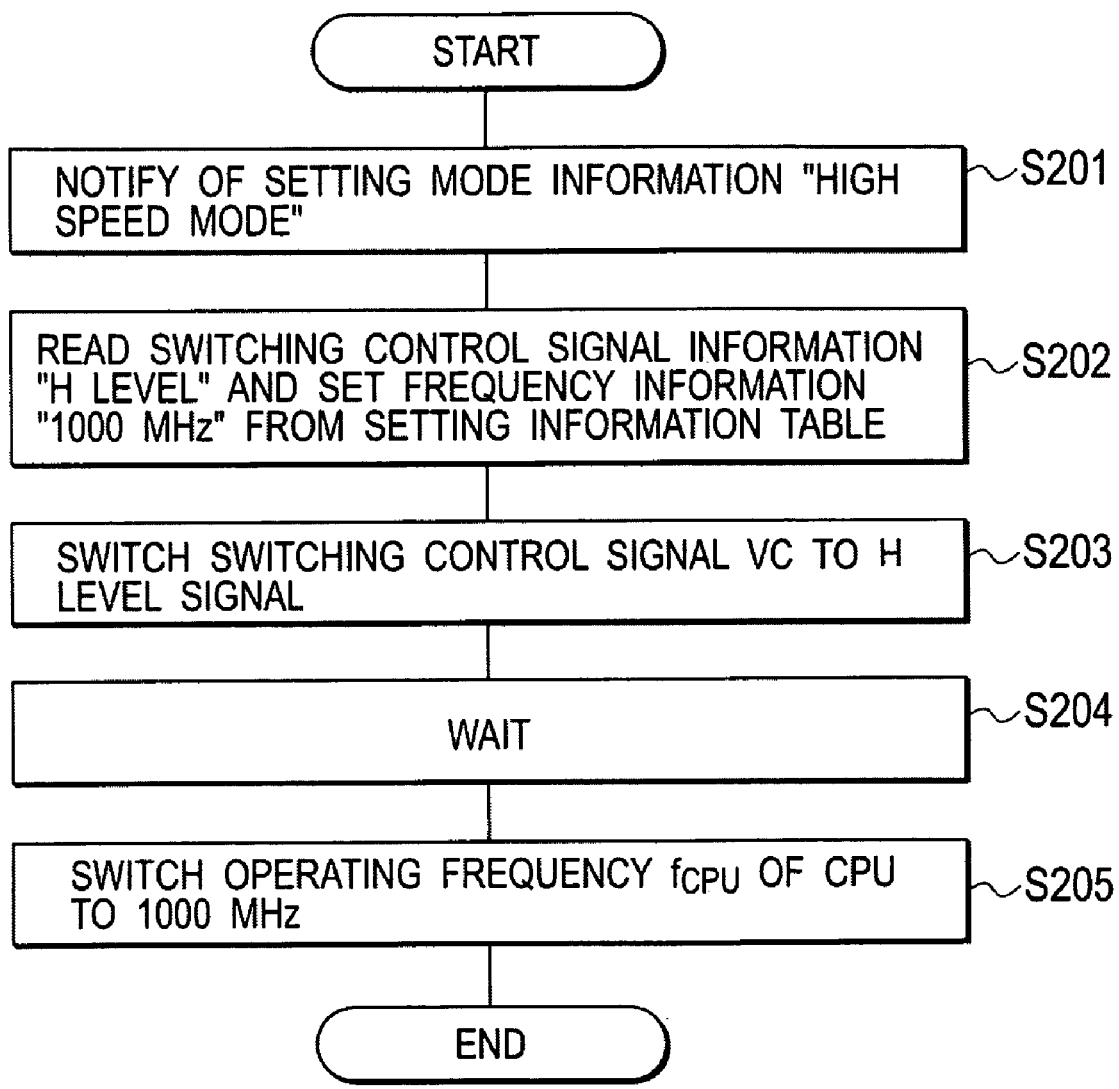
FIG. 9 is a first flow chart showing switching operation of Embodiment 1.

FIG. 9 is a first flowchart showing the switching operation of Embodiment 1 of the printer according to the invention.

The flow of the processing of Step S107 (FIG. 6) corresponds to the flow of the processing from time $t_4$ in the time chart shown in FIG. 7, and the flow of the processing of Step S113 (FIG. 5) corresponds to the flow of the processing from time $t_{10}$ in the time chart shown in FIG. 8.

When being notified by mode determination unit 25 of the setting mode information "high speed mode" in printer 10 (Step S201), mode setting unit 27 switches, based on the notification, the operation mode of CPU 23 from the low speed mode to the high speed mode in accordance with a procedure shown below.

First, mode setting unit 27 reads the setting information corresponding to the setting mode information "high speed mode", i.e., switching control signal information "H level" as well as set frequency information "1000 MHz", from the setting information table (FIG. 3) stored in setting information storage unit 26 (Step S202).

Next, mode setting unit 27 switches switching control signal VC 44, which is input into voltage switching controller 29, on the basis of the read switching control signal information "H level". Mode setting unit 27 switches switching control signal VC 44 to output from the L level signal to the H level signal (Step S203).

When switching control signal VC 44 input into voltage switching controller 29 is switched from the L level signal to the H level signal (Step S203), the FET operates in voltage switching controller 29 (FIG. 4), so that the current flows into resistance R2. Thereby, operating voltage $V_{CPU}$ supplied from CPU power supply unit 28 to CPU 23 becomes 1.5 V.

After switching the signal level of switching control signal VC 44, mode setting unit 27 waits for a predetermined period of time to stabilize voltage fluctuation of operating voltage $V_{CPU}$ (Step S204). Here, wait time in the embodiment is less than 1 ms.

Subsequently, mode setting unit 27 switches operating frequency $f_{CPU}$ of CPU 23 on the basis of the read set frequency information "1000 MHz". Mode setting unit 27 writes the set frequency information "1000 MHz" in the internal register of CPU 23 to switch operating frequency $f_{CPU}$ from 500 MHz to 1000 MHz (Step S205). Thereby, the operation mode switching processing of CPU 23 in printer 10 is terminated.

As mentioned above, the signal level of switching control signal VC 44 is switched on the basis of setting information table (FIG. 3), operating voltage $V_{CPU}$ of CPU 23 is raised to a higher voltage, and subsequently, operating frequency $f_{CPU}$ is switched to a higher frequency.

Next, with a flow chart shown in FIG. 10, description will be given of a flow of processing performed when the operation mode of CPU 23 is switched from the high speed mode to the low speed mode (Step S110 of FIG. 6).

Figure 10:
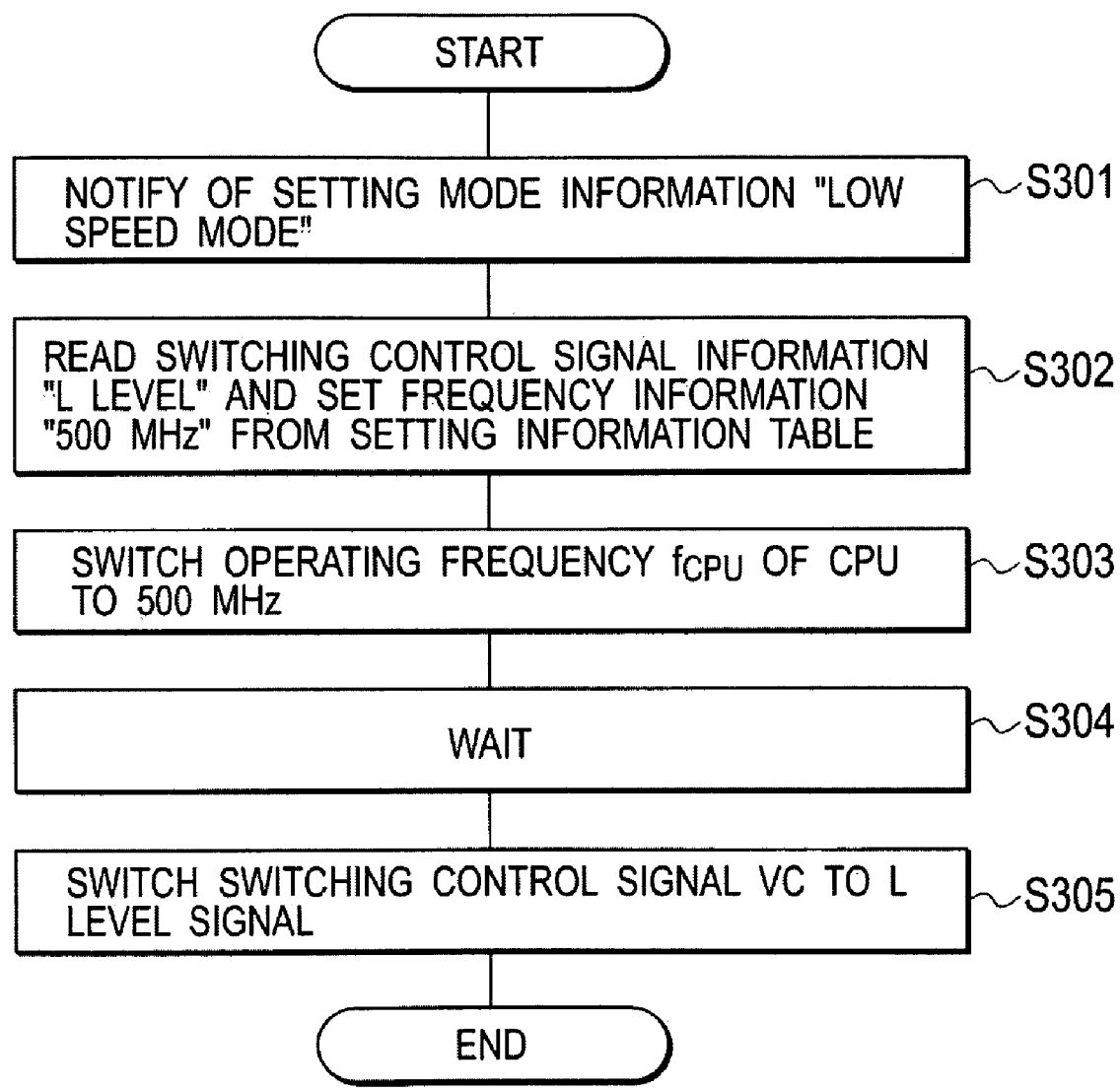
FIG. 10 is a second flow chart showing switching operation of Embodiment 1.

FIG. 10 is a second flow chart showing switching operation of Embodiment 1 of the printer according to the invention.

The flow of the processing of Step S110 (FIG. 6) corresponds to the flow of the processing from time $t_6$ in the time chart shown in FIG. 7, and corresponds to the flow of the processing from time $t_{13}$ in the time chart shown in FIG. 8.

When being notified by mode determination unit 25 of the setting mode information "low speed mode" in printer 10 (Step S301), mode setting unit 27 switches the operation mode of CPU 23 from the high speed mode to the low speed mode on the basis of the notification.

First, mode setting unit 27 reads the setting information corresponding to the setting mode information "low speed mode", i.e., the switching control signal information "L level" and the set frequency information "500 MHz", from the setting information table (FIG. 3) stored in setting information storage unit 26 (Step S302).

Next, mode setting unit 27 switches operating frequency $f_{CPU}$ of CPU 23 on the basis of the read set frequency information "500 MHz". Mode setting unit 27 writes the set frequency information "500 MHz" in the internal register of CPU 23 to switch operating frequency $f_{CPU}$ from 1000 MHz to 500 MHz (Step S303).

After performing writing to the internal register, the mode setting unit 27 waits for a predetermined period of time in order to wait for stabilization of operating frequency $f_{CPU}$ of CPU 23 (Step S304). Here, the wait time in the embodiment is less than 1 ms.

Subsequently, mode setting unit 27 switches the signal level of switching control signal VC 44 input into voltage switching controller 29 on the basis of the read switching control signal information "L level". Mode setting unit 27 switches switching control signal VC 44 to output from the H level signal to the L level signal (Step S305). When switching control signal VC 44 inputted into voltage switching controller 29 is switched from the H level signal to the L level signal (Step S305), the FET stops in voltage switching controller 29 (FIG. 4), so that operating voltage $V_{CPU}$ supplied from CPU power supply unit 28 to CPU 23 becomes 1.26 V. Thereby, the operation mode switching processing of CPU 23 in printer 10 is terminated.

As mentioned above, after operating frequency $f_{CPU}$ is switched to a lower frequency on the basis of the setting information table (FIG. 3), the signal level of switching control signal VC 44 is switched, and operating voltage $V_{CPU}$ of CPU 23 is reduced to a lower voltage.

As described above, during printing standby, printer 10 of the embodiment operates in the low speed mode by decreasing the operating frequency and operating voltage of CPU 23. Simultaneously, during execution of the printing job, the operation mode of CPU 23 is maintained in the low speed mode when the fixing device temperature is far from the fixing target temperature, and image formation unit 24 is in the state where image formation unit 24 cannot print. Then, only when image formation unit 24 is brought into the state where image formation unit 24 can print, CPU 23 operates in the high speed mode by increasing the operating frequency and operating voltage of CPU 23. Consequently, the power consumed by CPU 23 can be reduced without deteriorating the print speed.

In the embodiment, mode determination unit 25 determines whether the operation mode of CPU 23 needs to be switched or not based on received signal 40 from communication controller 21. Alternatively, whether or not switching is needed may be determined based not on received signal 40, but on change in the signal level of fixing device temperature signal 43 input from image formation unit 24. In this case, performance of printer 10 improves.

[Embodiment 2]

Figure 11:
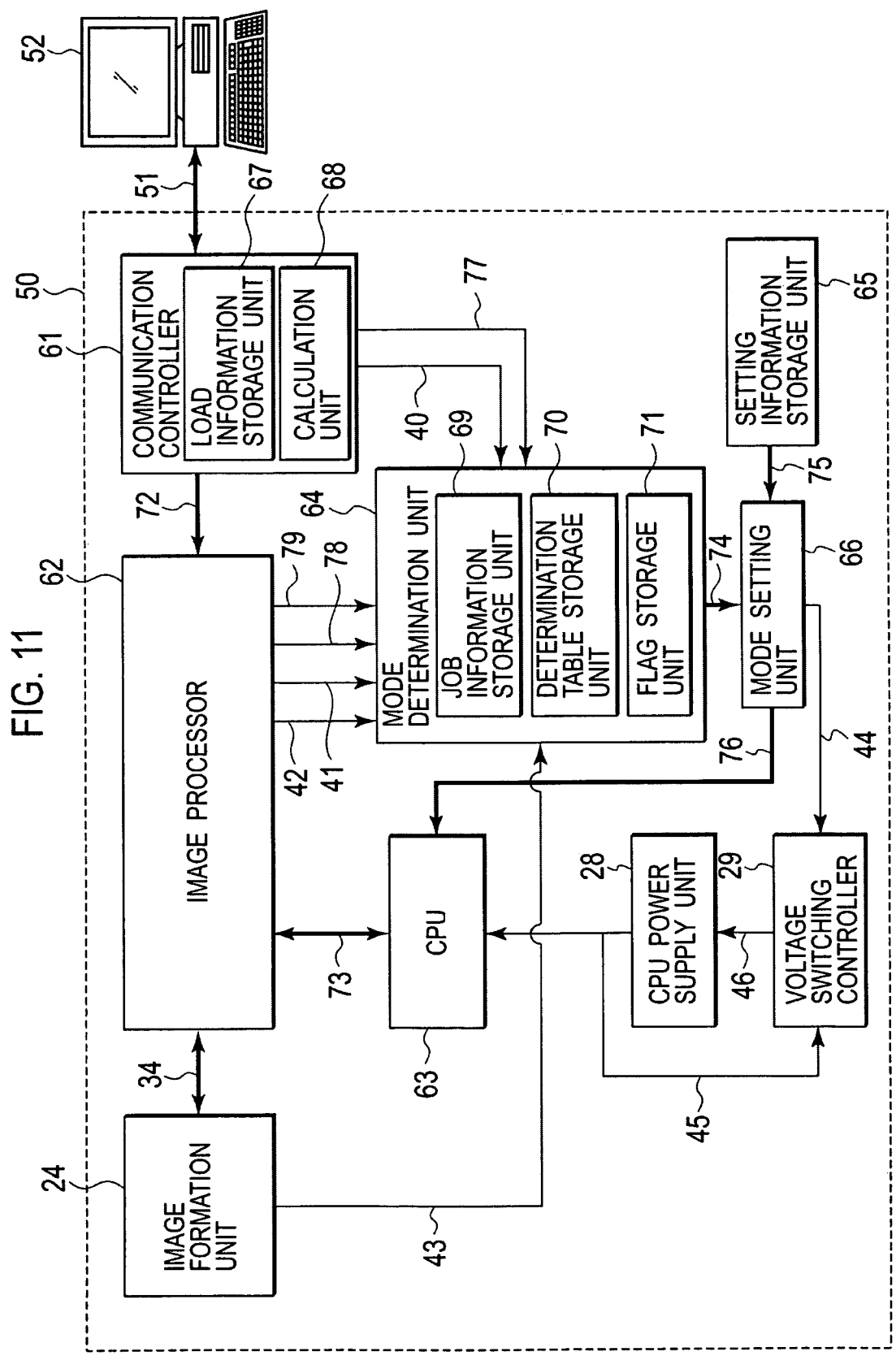
FIG. 11 is a block diagram showing a configuration of a printer according to Embodiment 2.

FIG. 11 is a block diagram showing a configuration of a printer according to Embodiment 2 of the invention.

Printer 50 of Embodiment 2 is different from the printer of Embodiment 1 in that communication controller 61 comprises load information storage unit 67 and calculation unit 68, and that a medium speed mode is added to the operation mode of CPU 63.

In the embodiment, the same reference numerals will be given to the same components as those in Embodiment 1, and detailed description of these components will be omitted.

As shown in FIG. 11, printer 50 of the embodiment is connected to personal computer 52 as a higher level device through communication line 51, receives a print job from personal computer 52, and performs printing processing.

As shown in FIG. 11, printer 50 serves as an image processing apparatus, and comprises communication controller 61, image processor 62, CPU 63, image formation unit 24, mode determination unit 64, setting information storage unit 65, mode setting unit 66, CPU power supply unit 28, and voltage switching controller 29.

Communication controller 61 includes host interfaces such as a network and a USB. Communication controller 61 is connected to personal computer 52 through communication line 51, and receives a print job including image data from the personal computer 52. Communication controller 61 also includes load information storage unit 67 and calculation unit 68, as shown in FIG. 11.

Load information storage unit 67 comprises a nonvolatile memory area, and stores a load information table. This load information table is used by calculation unit 68 to calculate an amount of load on CPU 63 as a total load point, when the input editing processing and the output processing are executed by image processor 62.

FIG. 12 is an explanatory view showing an example of the load information table.

As shown in FIG. 12, load point information pieces, each indicating a load point as a load unit, are set in the load information table in advance in association with respective parameters. In the embodiment, the parameters set to be used to calculate the total load point include: page description language (PDL) information that indicates a type of printer language; gradation and resolution information that indicates the gradation and resolution of the image data; and host interface information that indicates a type of host interface. In the embodiment, a larger numeric value of the load point information indicates that there is a larger amount of data to be processed in image processor 62, and the larger load is placed on CPU 63.

For example, in the load information table in FIG. 12, the load point information "2" is set in association with the PDL information "PS", and the load point information "0" is set in association with the PDL information "PCL".

Additionally, in the load information table, the load point information "0" is set in association with the gradation and resolution information "2 bits and 600 dpi×600 dpi", and the load point information "5" is set in association with the resolution information "5 bits and 600 dpi×1200 dpi".

Moreover, in the load information table, the load point information "0" is set in association with the host interface information "Centro" and "Rs-232c", the load point information "1" is set in association with the host interface information "USB-Full" and "LAN10/100", and the load point information "2" is set in association with the host interface information "USB-High" and "G-LAN".

With respect to the print job received by communication controller 61, calculation unit 68 analyzes the printer language used for description of the print job, and the gradation and resolution of the image data included in the print job, and acquires the PDL information and the gradation and resolution information. Calculation unit 68 also acquires the host interface information that indicates the type of the host interface used for reception of the print job. Calculation unit 68 calculates the total load point corresponding to the print job on the basis of the acquired PDL information, gradation and resolution information, and host interface information, as well as on the load information table (FIG. 12) stored in load information storage unit 67.

For example, when the received print job is described in the printer language "PS", the gradation of the image data is "2 bits", the resolution is "600 dpi×600 dpi", and the host interface used for reception of the print job is "USB-Full", calculation unit 68 reads the load point information "2" corresponding to the PDL information "PS", the load point information "0" corresponding to the gradation and resolution information "2 bits and 600 dpi×600 dpi" and the load point information "1" corresponding to the host interface information "USB-Full" from the load information table (FIG. 12). Then, calculation unit 68 totals these points, and calculates the total load point to be "3".

Communication controller 61 is connected to image processor 62 through bus signal line 72, and outputs the received print job to image processor 62. At this time, communication controller 61 gives the print job the job identification information for identifying the print job, and outputs the job identification information together with the print job. Communication controller 61 also outputs received signal 40 that indicates reception of the print job, and outputs message signal 77 for notification of the job identification information and the calculated total load point. Received signal 40 and message signal 77 output by communication controller 61 are inputted into mode determination unit 64.

Image processor 62 is connected to CPU 63 through bus signal line 73, and, as an edit-output unit, executes the input editing processing and output processing on each print job. Additionally, image processor 62 outputs output start signal 41 and output termination signal 42, and further outputs interrupt signal G-INT that indicates termination of the input editing processing. Hereinafter, interrupt signal G-INT output by image processor 62 into mode determination unit 64 is referred to as editing termination signal 78. Image processor 62 also outputs message signal 79 for notification of the job identification information corresponding to the print job.

CPU 63 is connected to image processor 62 through bus signal line 73 to control image processor 62. CPU 63 can operate at operating voltage $V_{CPU}$ of 1.26 V to 1.5 V and at operating frequency $f_{CPU}$ of 500 MHz to 1000 MHz, and in the embodiment, operates in either of the operation modes of the low speed mode, the medium speed mode, and the high speed mode. CPU 63 operates at a low voltage of $V_{CPU}$=1.26 V and at a low frequency of $f_{CPU}$=500 MHz in the low speed mode, and operates at a high voltage of $V_{CPU}$=1.5 V and at a medium frequency of $f_{CPU}$=700 MHz in the medium speed mode. CPU 63 also operates at a high voltage of $V_{CPU}$=1.5V and at a high frequency of $f_{CPU}$=1000 MHz in the high speed mode.

As in the case of Embodiment 1, when the power consumption of CPU 63 is 10 W in the high speed mode, the power consumption in the low speed mode is 63% of that in the high speed mode, i.e., 6.3 W. In the medium speed mode, while maintaining operating voltage $V_{CPU}$ at the high voltage of 1.5 V, operating frequency $f_{CPU}$ is lowered by 30% from the high frequency of 1000 MHz to the medium frequency of 700 MHz. Therefore, when an influence on the power consumption by operating frequency $f_{CPU}$ is estimated to be a half, i.e., 15%, the power consumption of CPU 63 in the medium speed mode is calculated to be 85% of the power consumption in the high speed mode, i.e., 8.5 W.

Mode determination unit 64 has job information storage unit 69, as shown in FIG. 11. Upon receipt of message signal 77 from communication controller 61, mode determination unit 64 stores the job identification information and the total load point, which are included in the message signal, in job information storage unit 69. Moreover, upon receipt of message signal 79 from image processor 62, mode determination unit 64 deletes the job identification information and the corresponding total load point, which are included in the message signal, from job information storage unit 69.

FIG. 13 is an explanatory view showing an example of the job information storage unit.

Job information storage unit 69 is a storage unit that stores the total load point of the print job on which the input editing processing is being executed in image processor 62. As shown in FIG. 13, the total load point is stored in association with the job identification information for each print job.

For example, in job information storage unit 69 in FIG. 13, the total load point "3" is stored in association with the job identification information "print job 1", the total load point "4" is stored in association with the job identification information "print job 2", and the total load point "6" is stored in association with the job identification information "print job 3". At this time, the print jobs on which the input editing processing is being executed are print job 1, print job 2, and print job 3 in image processor 62. Therefore, as a result of addition of these three total load points, "13" is obtained as the grand total load point that indicates the total of load on CPU 63.

Mode determination unit 64 also has determination table storage unit 70. As a judging unit and a determination unit, when an interrupt signal is input from communication controller 61 or image processor 62, mode determination unit 64 determines the setting mode on the basis of a determination table stored in determination table storage unit 70.

FIG. 14 is an explanatory view showing an example of the determination table in Embodiment 2.

As shown in FIG. 14, the setting mode information pieces are set in the determination table of the embodiment in advance. Each setting mode information piece is associated with the grand total load point and the signal state of the interrupt signal and control signal inputted from each unit.

For example in the determination table shown in FIG. 14, the setting mode information "high speed mode" is stored in association with the signal state "rise" of received signal 40 or editing termination signal 78, the signal state "L level" of fixing device temperature signal 43, and the grand total load point "11 or more". The setting mode information "medium speed mode" is stored in association with the signal state "rise" of received signal 40 or editing termination signal 81, the signal state "L level" of fixing device temperature signal 43, and the grand total load point "5 to 10". Furthermore, the setting mode information "low speed mode" is stored in association with the signal state "rise" of received signal 40 or editing termination signal 81, the signal state "L level" of fixing device temperature signal 43, and the grand total load point "0 to 4". This indicates that mode determination unit 64 determines the setting mode based on a value of the grand total load point when received signal 40 or editing termination signal 78 is inputted, and fixing device temperature signal 43 inputted from image formation unit 24 is the L level signal. Mode determination unit 64 calculates the grand total load point in accordance with job information storage unit 69. When the calculated grand total load point is 11 or more, mode determination unit 64 determines that the setting mode is the high speed mode. When the grand total load points are 5 to 10, mode determination unit 64 determines that the setting mode is the medium speed mode. When the grand total load point is not more than 4, mode determination unit 64 determines that the setting mode is the low speed mode.

Furthermore, mode determination unit 64 has flag storage unit 71 as a storage unit, and stores the flag information that indicates the current operation mode of CPU 63 in the flag storage unit 71. The flag information is "H" when the operation mode of CPU 63 is the high speed mode, "M" when the operation mode is the medium speed mode, and "L" when the operation mode is the low speed mode. As an updating unit, mode determination unit 64 updates the flag information stored in flag storage unit 71.

Setting information storage unit 65 is connected to mode setting unit 66 through bus signal line 75, and stores the setting information table.

FIG. 15 is an explanatory view showing an example of the setting information table in Embodiment 2.

As shown in FIG. 15, setting information including the switching control signal information and the set frequency information is stored in the setting information table in association with the setting mode information "high speed mode", "medium speed mode", and "low speed mode".

For example in the setting information table shown in FIG. 15, the switching control signal information "H level" and the set frequency information "1000 MHz" are stored in association with the setting mode information "high speed mode".

The switching control signal information "H level" and the set frequency information "700 MHz" are stored in association with the setting mode information "medium speed mode". Moreover, the switching control signal information "L level" and the set frequency information "500 MHz" are stored in association with the setting mode information "low speed mode".

Mode setting unit 66 is connected to mode determination unit 64 through bus signal line 74, and is connected to setting information storage unit 65 through bus signal line 75. Mode setting unit 66 is also connected to CPU 63 through bus signal line 76, and, as a frequency switching unit, switches operating frequency $f_{CPU}$ of CPU 63 on the basis of the setting mode information notified from mode information unit 64. Mode setting unit 66 outputs switching control signal VC 44 to voltage switching controller 29, and switches switching control signal VC 44 on the basis of the above-mentioned setting mode information.

For example, when mode setting unit 66 is notified of the setting mode information "medium speed mode" by mode determination unit 64, mode setting unit 66 changes switching control signal VC 44 to the H level signal on the basis of the switching control signal information "H level", and changes operating frequency $f_{CPU}$ of CPU 63 into 700 MHz on the basis of the set frequency information "700 MHz".

Next, operation of printer 50 of the Embodiment 2 will be described.

Figure 18:
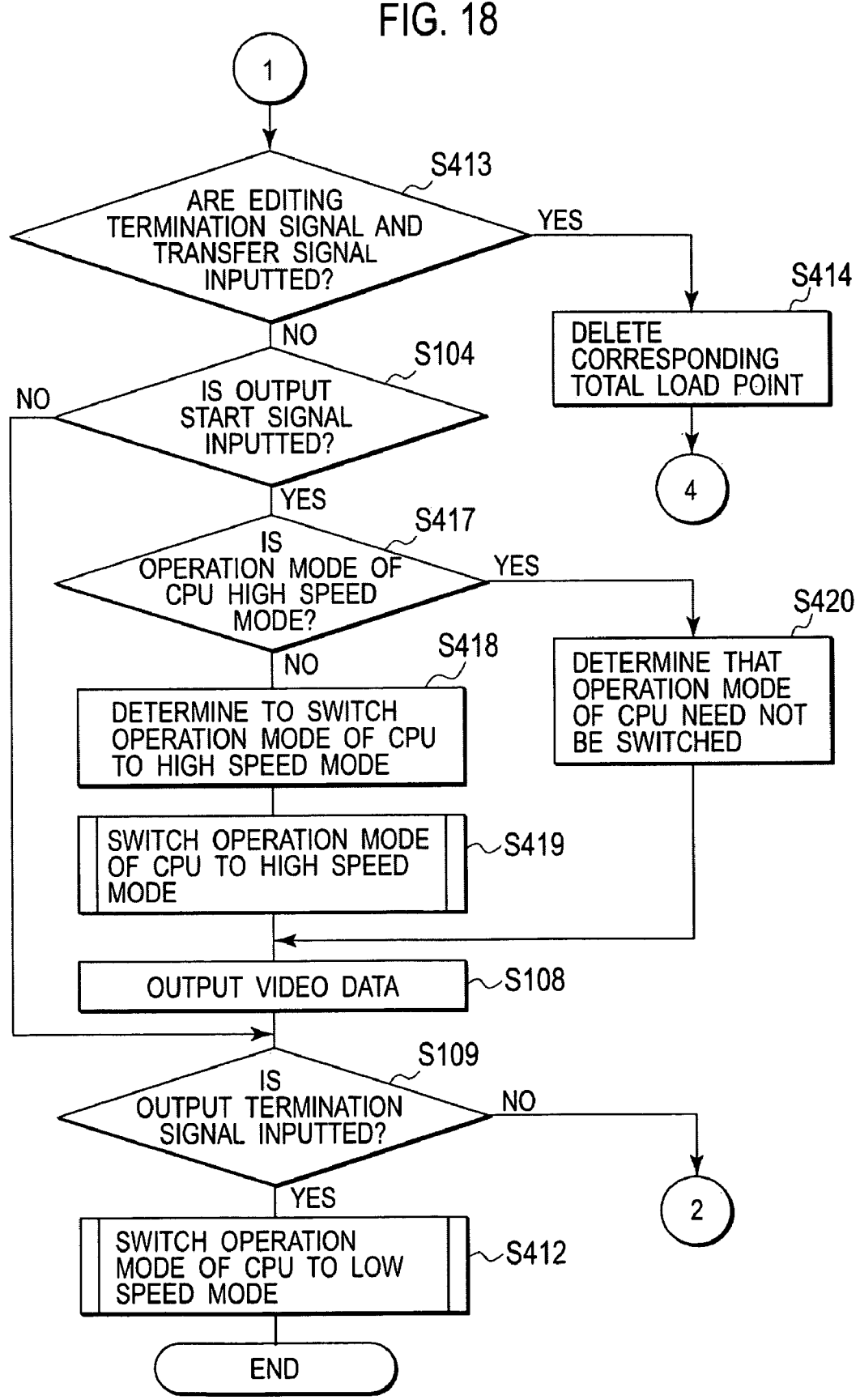
FIG. 18 is a third flow chart showing the print operation of Embodiment 2.
Figure 19:
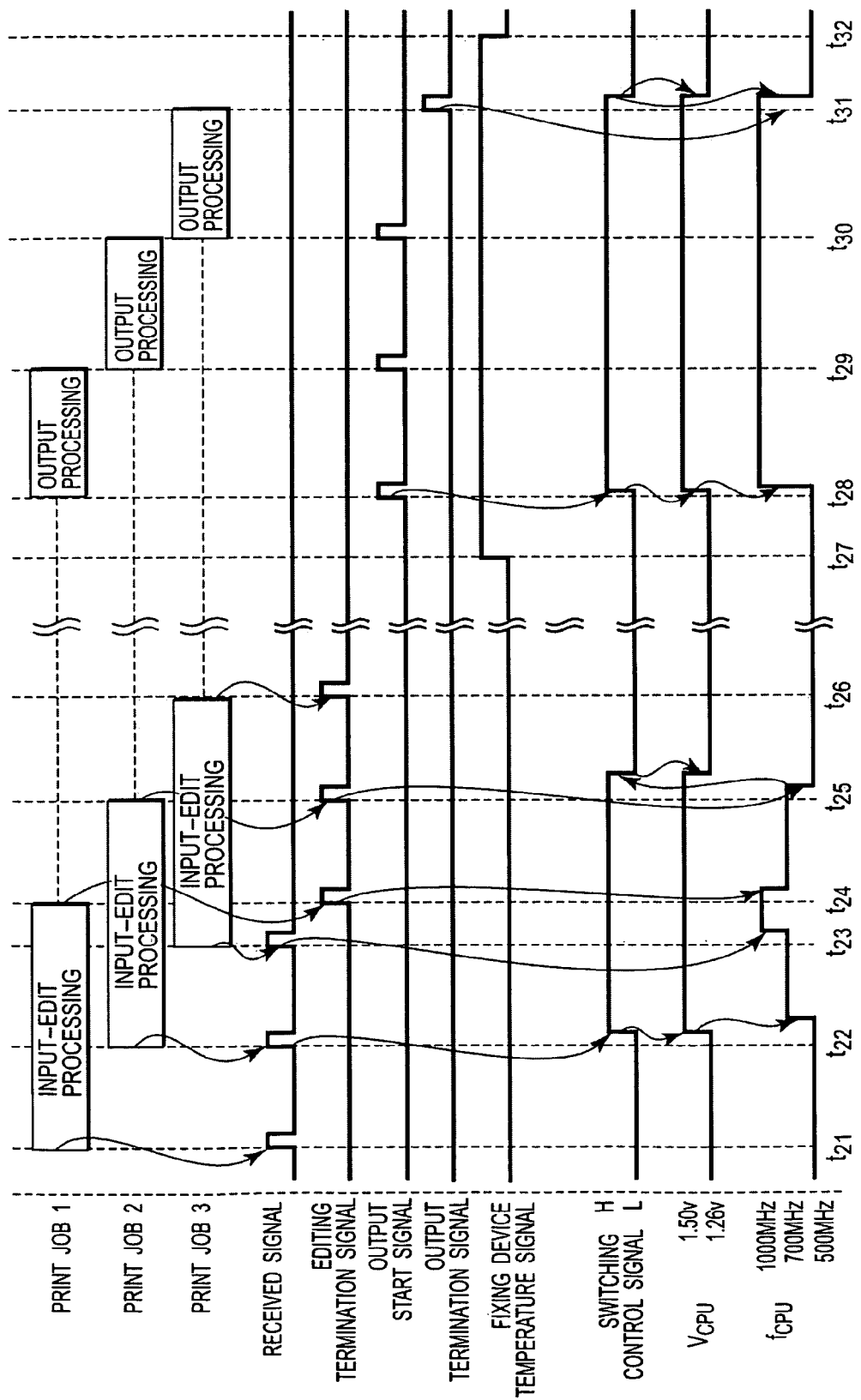
FIG. 19 is a first time chart showing print operation of Embodiment 2.

Here, with flow charts shown in FIGS. 16, 17, and 18, and a time chart shown in FIG. 19, description will be given of a flow of processing performed when print job 1, print job 2, and print job 3 are sequentially received from personal computer 52 with printer 50 in the printing standby state.

Figure 16:
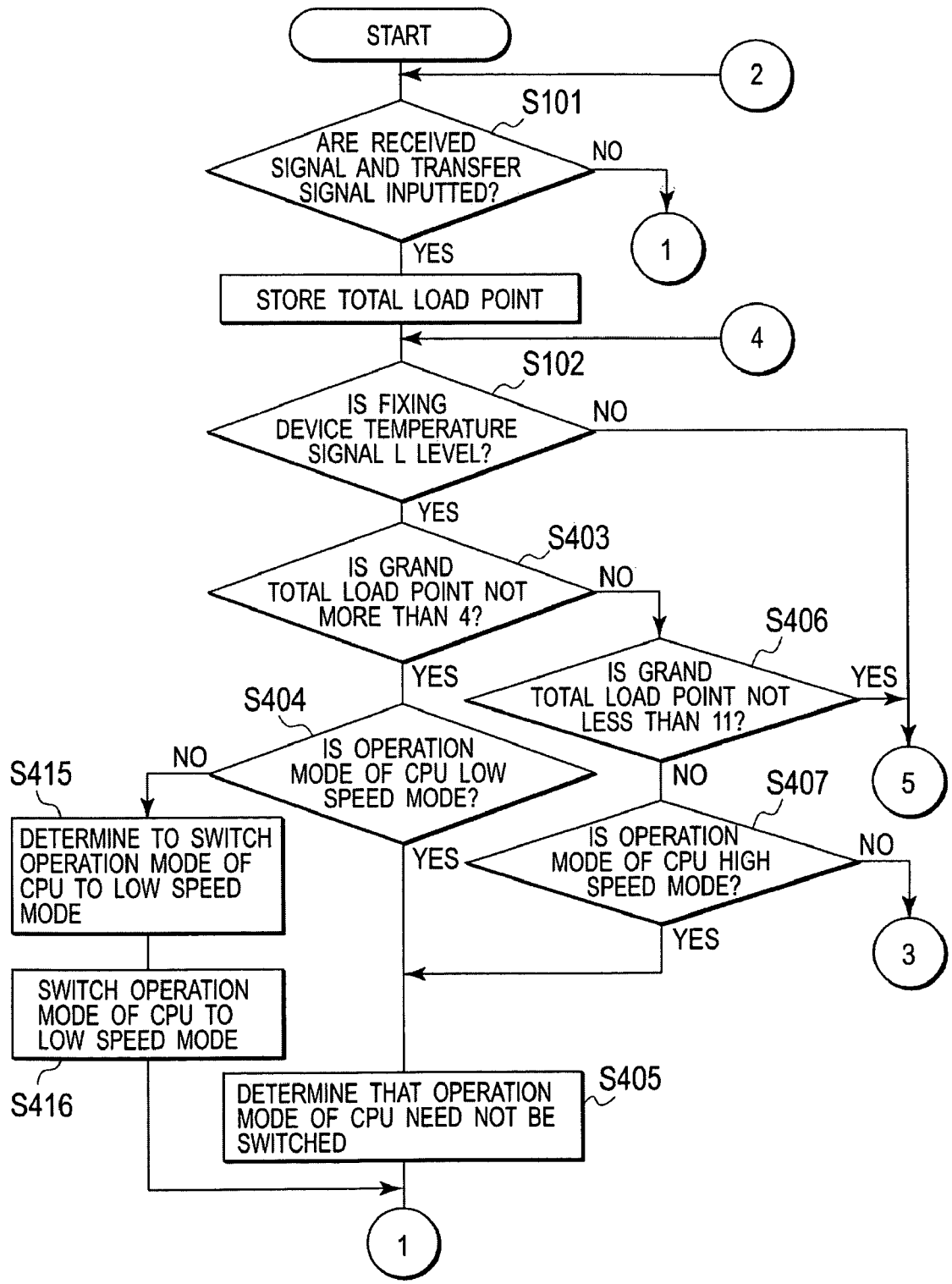
FIG. 16 is a first flow chart showing print operation of Embodiment 2.
Figure 17:
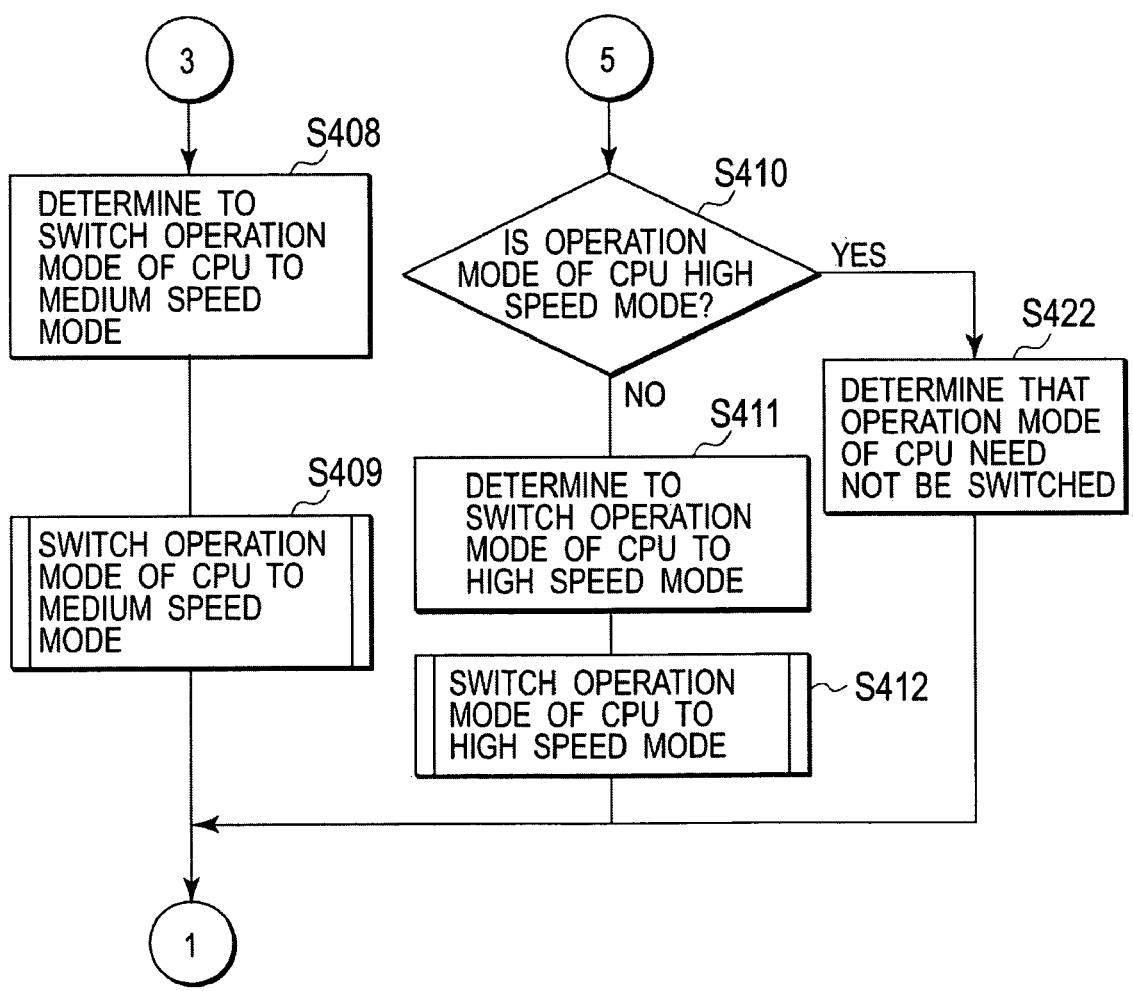
FIG. 17 is a second flow chart showing the print operation of Embodiment 2.

FIG. 16 is a first flow chart showing print operation of Embodiment 2 of the printer, and FIG. 17 is a second flow chart showing the print operation of Embodiment 2 of the printer according. FIG. 18 is a third flow chart showing the print operation of Embodiment 2 of the printer, and FIG. 19 is a first time chart showing the print operation of Embodiment 2 of the printer. In FIG. 19, symbols $t_{21}$ to $t_{31}$ shown below indicate time.

In the embodiment, description will be given, as an example, of a case where fixing device temperature of image formation unit 24 is out of the range of $T_c \pm 20$ degrees C. upon receipt of print job 1, print job 2, and print job 3, and upon termination of input editing processing on the print jobs, in other words, when the fixing device temperature is far from fixing target temperature $T_c$, and it takes some time to bring image formation unit 24 into the printable state. FIG. 20 shows received print job 1, print job 2, and print job 3 each in association with the PDL information, the gradation and resolution information, and the host interface information, as well as the total load point.

FIG. 20 is an explanatory view showing an example of calculation of the total load point of the print job.

First, communication controller 61 in printer 50 receives print job 1 from personal computer 52. Communication controller 61 gives job identification information "print job 1" to received print job 1.

Calculation unit 68 then acquires PDL information, gradation and resolution information, and host interface information which correspond to print job 1, and calculates the total load point on the basis of the acquired information. As shown in FIG. 20, print job 1 is received from personal computer 52 through the host interface "USB-Full", is described in the printer language "PS", and includes the image data of the gradation of "2 bits" and the resolution of "600 dpi×600 dpi". Calculation unit 68 acquires the PDL information "PS", the gradation and resolution information "2 bits and 600 dpi×600 dpi", and the host interface information "USB-Full" from print job 1. Then, from the load information table (FIG. 12) of load information storage unit 67, calculation unit 68 reads the load point information "2" corresponding to the PDL information "PS", the load point information "0" corresponding to the gradation and resolution information "2 bits and 600 dpi×600 dpi", and the load point information "1" corresponding to the host interface information "USB-Full". Calculation unit 68 totals these points and calculates the total load point to be "3".

Communication controller 61 outputs received print job 1 and the job identification information "print job 1" given to the print job to image processor 62. Simultaneously, communication controller 61 outputs received signal 40 that indicates reception of print job 1, and message signal 77 for notification of the job identification information "print job 1" and the total load point "3".

Image processor 62 starts the input editing processing on the print job 1 in response to input of print job 1 by communication controller 61. The start time of this input editing processing is $t_{21}$ (FIG. 19). Image processor 62 also starts power supply to the fixing device to bring image formation unit 24 into the printable state.

Synchronizing with start of the input editing processing on print job 1 by image processor 62 ($t_{21}$ (FIG. 19)), received signal 40 and message signal 77 are input into mode determination unit 64 from communication controller 61 (Step S401). In response to this input, mode determination unit 64 stores the job identification information "print job 1" and the total load point "3", which are included in message signal 77, in job information storage unit 69, in association with each other (Step S402).

Next, in order to determine whether or not to switch the operation mode, mode determination unit 64 determines whether fixing device temperature signal 43 inputted from image formation unit 24 is the L level signal or not based on the determination table (FIG. 14) stored in determination table storage unit 70 (Step S102). Since image formation unit 24 has output the L level signal as fixing device temperature signal 43 (FIG. 19), mode determination unit 64 determines that fixing device temperature signal 43 is the L level signal (Step S102).

When fixing device temperature signal 43 is determined to be the L level signal (Step S102), mode determination unit 64 sums up total load points stored in job information storage unit 69 to obtain the grand total load point of the print jobs that are being processed in image processor 62. Since only the total load point "3" corresponding to the job identification information "print job 1" is stored in job information storage unit 69, mode determination unit 64 determines that the grand total load point is not more than 4 (Step S403).

In the determination table (FIG. 14), the setting mode information "low speed mode" is stored in association with the signal state "rise" of received signal 40, the signal state "L level" of fixing device temperature signal 43, and the grand total load point "0 to 4". Therefore, mode determination unit 64 determines that the setting mode is the low speed mode. Then, in order to determine whether or not the operation mode of CPU 63 coincides with the setting mode, mode determination unit 64 reads the flag information from flag storage unit 71, and on the basis of the flag information, determines whether the operation mode of CPU 63 is the low speed mode or not (Step S404). Since the flag information "L" is stored in flag storage unit 71, mode determination unit 64 determines that the operation mode of CPU 63 is the low speed mode (Step S404).

When the operation mode is determined to be the low speed mode (Step S404), the setting mode and the operation mode coincide with each other. Therefore, mode determination unit 64 determines that the operation mode of CPU 63 need not be switched (Step S405).

Next, communication controller 61 receives print job 2 from personal computer 52. At this time, image processor 62 is executing the input editing processing on print job 1 (FIG. 19). Communication controller 61 gives job identification information "print job 2" to received print job 2. Calculation unit 68 then acquires PDL information, gradation and resolution information, and host interface information which correspond to print job 2, and calculates the total load point. As shown in FIG. 20, print job 2 is received from personal computer 52 through the host interface "G-LAN", described in printer language "PS", and includes the image data of the gradation "2 bits" and the resolution "600 dpi×600 dpi". Therefore, calculation unit 68 acquires the PDL information "PS", the gradation and resolution information "2 bits and 600 dpi×600 dpi", and the host interface information "G-LAN" from print job 2 (FIG. 20), and calculates total load point "4" on the basis of the load information table (FIG. 12).

Communication controller 61 outputs received print job 2 and given job identification information "print job 2" to image processor 62, and simultaneously, outputs received signal 40 and message signal 77 for notification of the job identification information "print job 2" and the total load point "4".

In response to input of print job 2 by communication controller 61, image processor 62 starts the input editing processing on the print job 2. The start time of this input editing processing is $t_{22}$ (FIG. 19).

Synchronizing with start of the input editing processing on print job 2 by image processor 62 ($t_{22}$ (FIG. 19)), received signal 40 and message signal 77 are inputted into mode determination unit 64 from communication controller 61 (Step S401). In response to this input, mode determination unit 64 stores the job identification information "print job 2" and the total load point "4", which are included in message signal 77, in job information storage unit 69 in association with each other (Step S402).

Next, in order to determine whether or not to switch the operation mode, mode determination unit 64 determines whether fixing device temperature signal 43 input from image formation unit 24 is the L level signal or not based on the determination table (FIG. 14) stored in determination table storage unit 70 (Step S102). Since image formation unit 24 has output the L level signal as fixing device temperature signal 43 (FIG. 19), mode determination unit 64 determines that fixing device temperature signal 43 is the L level signal (Step S102).

Next, mode determination unit 64 calculates the grand total load point of the print jobs that are being processed in image processor 62. Since the total load point "3" corresponding to the job identification information "print job 1" and the total load point "4" corresponding to the job identification information "print job 2" are stored in job information storage unit 69, mode determination unit 64 calculates the grand total load point to be "7" by summing up these total load points. Therefore, mode determination unit 64 determines that the grand total load point is 5 to 10 (Step S403, S406).

The setting mode information "medium speed mode" is stored in the determination table (FIG. 14) in association with the signal state "rise" of received signal 40, the signal state "L level" of fixing device temperature signal 43, and the grand total load point "5 to 10". Therefore, mode determination unit 64 determines that the setting mode is the medium speed mode. Then, mode determination unit 64 reads the flag information from flag storage unit 71, and determines whether or not the operation mode of CPU 63 is the medium speed mode (Step S407). Since the flag information "L" is stored in flag storage unit 71, mode determination unit 64 determines that the operation mode of CPU 63 is the low speed mode, i.e., not the medium speed mode (Step S407).

Determination that the operation mode is not the medium speed mode (Step S407) indicates that the setting mode and the operation mode do not coincide with each other. Therefore, mode determination unit 64 determines that the operation mode of CPU 63 should be switched to the medium speed mode (Step S408).

Based on this determination, mode determination unit 64 updates the flag information of flag storage unit 71 to "M", and simultaneously, notifies mode setting unit 66 of the setting mode information "medium speed mode". Then, mode setting unit 66 executes the processing to switch the operation mode of CPU 63 to the medium speed mode (Step S409). Mode setting unit 66 performs the processing to switch the operation mode from the low speed mode to the medium speed mode as follows.

Mode setting unit 66 reads the setting information corresponding to the setting mode information "medium speed mode" i.e., the switching control signal information "H level" and the set frequency information "700 MHz", from the setting information table (FIG. 15) stored in setting information storage unit 65. Then, mode setting unit 66 switches switching control signal VC 44 input into voltage switching controller 29 from the L level signal to the H level signal on the basis of the read switching control signal information "H level". In response to this switching, operating voltage $V_{CPU}$ supplied to CPU 63 from CPU power supply unit 28 is raised from the lower voltage of 1.26 V to the higher voltage of 1.5 V.

After the switching of switching control signal VC 44, mode setting unit 66 waits for stabilization of operating voltage $V_{CPU}$, and switches operating frequency $f_{CPU}$ of CPU 63. Mode setting unit 66 writes the set frequency information "700 MHz" in the internal register of CPU 63, and changes operating frequency $f_{CPU}$ from the lower frequency of 500 MHz to the medium frequency of 700 MHz. Thereby, the switching processing is completed.

Next, communication controller 61 receives print job 3 from personal computer 52. At this time, image processor 62 is executing the input editing processing on print job 1 and print job 2 (FIG. 18). Communication controller 61 gives job identification information "print job 3" to received print job 3. Calculation unit 68 then acquires PDL information, gradation and resolution information, and host interface information which correspond to this print job 3, and simultaneously, calculates the total load point. As shown in FIG. 20, print job 3 is received from personal computer 52 through the host interface "LAN10/100", described in the printer language "PCL", and includes the image data of the gradation "5 bits" and the resolution "600 dpi×1200 dpi". Calculation unit 68 acquires the PDL information "PCL", the gradation and resolution information "5 bits and 600 dpi×1200 dpi", and the host interface information "LAN10/100" from this print job 3, and based on the load information table (FIG. 12), calculates total load point to be "6" (FIG. 20).

Communication controller 61 outputs the received print job and the given job identification information "print job 3" to image processor 62. Simultaneously, communication controller 61 outputs received signal 40 and message signal 77 for notification of the job identification information "print job 3" and the total load point "6".

In response to input of print job 3 by communication controller 61, image processor 62 starts the input editing processing on the print job 3. The start time of this input editing processing is $t_{23}$ (FIG. 19).

Synchronizing with start of the input editing processing on print job 3 by image processor 62 ($t_{23}$ (FIG. 19)), received signal 40 and message signal 77 are input into mode determination unit 64 from communication controller 61 (Step S401). In response to this input, mode determination unit 64 stores the job identification information "print job 3" and the total load point "6", which are included in message signal 77, in job information storage unit 69 in association with each other (Step S402).

Next, in order to determine whether or not to switch the operation mode, mode determination unit 64 determines whether fixing device temperature signal 43 is the L level signal or not (Step S102). Since image formation unit 24 has output the L level signal as fixing device temperature signal 43 (FIG. 19), mode determination unit 64 determines that fixing device temperature signal 43 is the L level signal (Step S102).

Next, mode determination unit 64 calculates the grand total load point of the print jobs that are being processed in image processor 62. The total load point "3" corresponding to the job identification information "print job 1", the total load point "4" corresponding to the job identification information "print job 2", and the total load point "6" corresponding to the job identification information "print job 3" are stored in job information storage unit 69. Therefore, mode determination unit 64 calculates the grand total load point to be "13" by summing up these total load points. Accordingly, mode determination unit 64 determines that the total load point is not less than 11 (Step S403, S406).

The setting mode information "high speed mode" is stored in the determination table (FIG. 14) in association with the signal state "rise" of received signal 40, the signal state "L level" of fixing device temperature signal 43, and the grand total load point "11 or more". Therefore, mode determination unit 64 determines that the setting mode is the high speed mode. Then, mode determination unit 64 reads the flag information from flag storage unit 71 to determine whether or not the operation mode of CPU 63 is the high speed mode (Step S410). Since the flag information "M" is stored in flag storage unit 71, mode determination unit 64 determines that the operation mode of CPU 63 is the medium speed mode, i.e., not the high speed mode (Step S410).

Determination that the operation mode is not the high speed mode (Step S410) indicates that the setting mode and the operation mode do not coincide with each other. Accordingly, mode determination unit 64 determines to switch the operation mode of CPU 63 to the high speed mode (Step S411).

Based on this determination, mode determination unit 64 updates the flag information of flag storage unit 71 to "H", and simultaneously, notifies mode setting unit 66 of the setting mode information "high speed mode". Then, mode setting unit 66 executes the processing to switch the operation mode of CPU 63 to the high speed mode (Step S412). Mode setting unit 66 performs the processing to switch the operation mode from the medium speed mode to the high speed mode as follows.

Mode setting unit 66 reads the setting information corresponding to the setting mode information "high speed mode", i.e., the switching control signal information "H level" and the set frequency information "1000 MHz", from the setting information table (FIG. 15) stored in setting information storage unit 65. Since mode setting unit 66 is outputting the H level signal as switching control signal VC 44 (FIG. 19), mode setting unit 66 determines that the signal level of switching control signal VC 44 need not be switched, and switches operating frequency $f_{CPU}$ of CPU 63. Mode setting unit 66 writes the set frequency information "1000 MHz" in the internal register of CPU 63, and changes operating frequency $f_{CPU}$ from the medium frequency of 700 MHz to the higher frequency of 1000 MHz. Thereby, the switching processing is completed.

Next, when the input editing processing to print job 1 is terminated, image processor 62 outputs editing termination signal 78 and message signal 79 for notification of the job identification information "print job 1" ($t_{24}$ (FIG. 19)).

When editing termination signal 78 and message signal 79 are input into mode determination unit 64 (Step S413), mode determination unit 64 deletes the total load point "3" corresponding to job identification information "print job 1" from job information storage unit 69 (FIG. 13) on the basis of the job identification information "print job 1" included in the message signal 79 (Step S414).

Next, mode determination unit 64 determines the signal level of fixing device temperature signal 43 to determine the setting mode (Step S102). When mode determination unit 64 determines that the signal level of fixing device temperature signal 43 is the L level (Step S102), mode determination unit 64 calculates the grand total load point. The total load point "4" corresponding to the job identification information "print job 2" and the total load point "6" corresponding to the job identification information "print job 3" are stored in job information storage unit 69. Accordingly, mode determination unit 64 calculates the grand total load point to be "10", and determines that the grand total load point is 5 to 10 (Step S403, S406).

Then, mode determination unit 64 reads the signal state "rise" of editing termination signal 78, the signal state "L level" of fixing device temperature signal 43, and the setting mode information "medium speed mode" corresponding to the grand total load point "5 to 10" from the determination table (FIG. 14). Mode determination unit 64 reads the flag information "H" from flag storage unit 71. When mode determination unit 64 determines that the operation mode is the high speed mode and not in the medium speed mode (Step S407), mode determination unit 64 determines to switch the operation mode of CPU 63 from the high speed mode to the medium speed mode (Step S408).

Based on this determination, mode determination unit 64 updates flag information of flag storage unit 71 to "M", and simultaneously, notifies mode setting unit 66 of the setting mode information "medium speed mode". Then, mode setting unit 66 executes the processing to switch the operation mode of CPU 63 to the medium speed mode (Step S409). Mode setting unit 66 performs the processing to switch the operation mode from the high speed mode to the medium speed mode as follows.

Mode setting unit 66 reads the setting information corresponding to the setting mode information "medium speed mode", i.e., the switching control signal information "H level" and the set frequency information "700 MHz", from the setting information table (FIG. 15) stored in setting information storage unit 65. Since mode setting unit 66 is outputting the H level signal as switching control signal VC 44 in the high speed mode of CPU 63 (FIG. 19), the signal level of switching control signal VC 44 need not be switched. Therefore, mode setting unit 66 switches operating frequency $f_{CPU}$ of CPU 63. Mode setting unit 66 writes the set frequency information "700 MHz" in the internal register of CPU 63, and reduces operating frequency $f_{CPU}$ from the higher frequency of 1000 MHz to the medium frequency of 700 MHz. Thereby, the switching processing is completed.

Subsequently, when the input editing processing on print job 2 is terminated, image processor 62 outputs editing termination signal 78, and message signal 79 for notification of the job identification information "print job 2" ($t_{25}$ (FIG. 19)).

When editing termination signal 78 and message signal 79 are input into mode determination unit 64 (Step S413), mode determination unit 64 deletes the total load point "4" corresponding to the job identification information "print job 2" from job information storage unit 69 on the basis of the job identification information "print job 2" included in the message signal 79 (Step S414).

Then, in order to determine the setting mode, mode determination unit 64 determines the signal level of fixing device temperature signal 43 (Step S102). When mode determination unit 64 determines that the signal level of fixing device temperature signal 43 is the L level (Step S102), mode determination unit 64 calculates the grand total load point. Since total load point "6" corresponding to the job identification information "print job 3" is stored in job information storage unit 69, mode determination unit 64 calculates the grand total load point to be "6", and determines that the grand total load point is 5 to 10 (Step S403, S406).

Then, mode determination unit 64 reads the signal state "rise" of editing termination signal 78, the signal state "L level" of fixing device temperature signal 43, and the setting mode information "medium speed mode" which correspond to the grand total load point "5 to 10" from the determination table (FIG. 14). When determining that the operation mode is the medium speed mode by reading the flag information "M" from flag storage unit 71 (Step S407), mode determination unit 64 determines that the operation mode of CPU 63 need not be switched (Step S405).

Subsequently, when the input editing processing on print job 3 is terminated, image processor 62 outputs editing termination signal 78 and message signal 79 for notification of the job identification information "print job 3" ($t_{26}$ (FIG. 19)).

When editing termination signal 78 and message signal 79 are input into mode determination unit 64 (Step S413), mode determination unit 64 deletes total load point "6" corresponding to the job identification information "print job 3" from job information storage unit 69 on the basis of the job identification information "print job 3" included in the message signal 79 (Step S414).

Subsequently, in order to determine the setting mode, mode determination unit 64 determines the signal level of fixing device temperature signal 43 (Step S102). When determining that the signal level of fixing device temperature signal 43 is the L level (Step S102), mode determination unit 64 calculates the grand total load point. Since the input editing processing on each print job in image processor 62 is terminated at this time, neither print job identification information nor grand total load point is stored in job information storage unit 69. Therefore, mode determination unit 64 obtains the grand total load point "0", and determines that the grand total load point is not more than 4 (Step S403).

Then, mode determination unit 64 reads the setting mode information "low speed mode" corresponding to the signal state "rise" of editing termination signal 78, the signal state "L level" of fixing device temperature signal 43, and the grand total load point "0 to 4" from the determination table (FIG. 14). Additionally, mode determination unit 64 reads the flag information "M" from flag storage unit 71, and therefore determines that the operation mode is the medium speed mode, i.e., not the low speed mode (Step S404). Then, mode determination unit 64 determines to switch the operation mode of CPU 63 from the medium speed mode to the low speed mode (Step S415).

Based on this determination, mode determination unit 64 updates the flag information of flag storage unit 71 to "L", and simultaneously, notifies mode setting unit 66 of the setting mode information "low speed mode". Then, mode setting unit 66 executes the processing to switch the operation mode of CPU 63 to the low speed mode (Step S416). Mode setting unit 66 performs the processing to switch the operation mode from the medium speed mode to the low speed mode as follows.

Mode setting unit 66 reads the setting information corresponding to the setting mode information "low speed mode", i.e., the switching control signal information "L level" and the set frequency information "500 MHz", from the setting information table (FIG. 15) stored in setting information storage unit 65. Then, first, mode setting unit 66 writes the set frequency information "500 MHz" in the internal register of CPU 63, and changes operating frequency $f_{CPU}$ from the medium frequency of 700 MHz to the lower frequency of 500 MHz.

Mode setting unit 66 waits for stabilization of operating frequency $f_{CPU}$, and further switches the signal level of switching control signal VC 44. Since mode setting unit 66 is outputting the H level signal as switching control signal VC 44 in the medium speed mode of CPU 63 (FIG. 18), mode setting unit 66 switches the switching control signal VC 44 to the L level signal. In response to this switching, operating voltage $V_{CPU}$ supplied from CPU power supply unit 28 to CPU 63 is reduced from the higher voltage of 1.5 V to the lower voltage of 1.26 V. Thereby, the switching processing is completed.

In image processor 62, all the input editing processing on print job 1, print job 2, and print job 3 is terminated, and the video data for each print job is generated. Subsequently, in image formation unit 24, when the fixing device temperature reaches the temperature within the range of fixing target temperature $T_c \pm 20$ degrees C., fixing device temperature signal 43 output from image formation unit 24 turns into the H level signal. This time is shown as $t_{27}$ in FIG. 19. After predetermined period of time passes after fixing device temperature signal 43 output from image formation unit 24 turns into the H level signal, fixing device temperature reaches fixing target temperature $T_c$. Thereby, image formation unit 24 is brought into the printable state. Waiting for this printing possible state, image processor 62 outputs output start signal 41 ($t_{28}$ (FIG. 19)).

Upon receipt of output start signal 41 from image processor 62 (Step S104), mode determination unit 64 reads the flag information from flag storage unit 71 to determine whether or not the operation mode of CPU 63 is the high speed mode (Step S417). Thereby, mode determination unit 64 determines whether or not to switch the operation mode on the basis of the determination table (FIG. 14).

Since the operation mode of CPU 63 is the low speed mode at this time, the flag information "L" is stored in flag storage unit 71. When mode determination unit 64 reads the flag information "L", mode determination unit 64 determined that the operation mode is the low speed mode, i.e., not the high speed mode (Step S417). Then, mode determination unit 64 determines that the operation mode and the setting mode do not coincide with each other, in order words, that the high speed mode of the operation mode needs to be switched (Step S418).

Based on this determination, mode determination unit 64 updates the flag information of flag storage unit 71 to "H", and simultaneously, notifies mode setting unit 66 of the setting mode information "high speed mode". Then, mode setting unit 66 executes the processing to switch the operation mode of CPU 63 from the low speed mode to the high speed mode (Step S419). Since a flow of the processing to switch the operation mode from the low speed mode to the high speed mode is the same as that of Embodiment 1 (FIG. 9), description thereof will be omitted.

When the switching processing of the operation mode by mode setting unit 66 is terminated, image processor 62 sequentially outputs the video data generated based on print job 1 page by page (Step S108). Then, image formation unit 24 executes the printing processing on a print medium on the basis of the input video data.

When output of the video data corresponding to print job 1 is terminated, image processor 62 outputs output start signal 41 to start output of the video data corresponding to print job 2 ($t_{29}$ (FIG. 19)). Upon receipt of output start signal 41 (Step S104), mode determination unit 64 reads the flag information "H" from flag storage unit 71, determines that the operation mode of CPU 23 is the high speed mode (Step S417), and determines that the operation mode need not be switched (Step S420). Then, image processor 62 outputs the video data corresponding to print job 2 (Step S108).

When output of the video data corresponding to print job 2 is terminated, image processor 62 outputs output start signal 41 to perform the same processing on print job 3 ($t_{30}$ (FIG. 19)). Upon receipt of output start signal 41 (Step S104), mode determination unit 64 reads the flag information "H" from flag storage unit 71, and determines that the operation mode of CPU 23 is the high speed mode (Step S417). Thereby, mode determination unit 64 determines that the operation mode need not be switched (Step S420). Then, the video data corresponding to print job 3 is outputted (Step S108).

When output of all the video data generated and accumulated is terminated, image processor 62 outputs output termination signal 42 ($t_{31}$ (FIG. 19)).

When output termination signal 42 is input into mode determination unit 64 from image processor 62 (Step S109), mode determination unit 64 updates the flag information of flag storage unit 71 to "L" to switch the operation mode of CPU 63 to the low speed mode on the basis of determination table (FIG. 14), and simultaneously, notifies mode setting unit 66 of the setting mode information "low speed mode". Then, mode setting unit 66 executes the processing to switch the operation mode of CPU 63 from the high speed mode to the low speed mode (Step S421). Since the processing to switch the operation mode from the high speed mode to the low speed mode is the same as that of Embodiment 1 (FIG. 10), description thereof will be omitted.

Then, when the printing processing on the basis of each video data in image formation unit 24 is completed, the printing job in printer 50 is terminated. When the period of time passes after termination of the printing job, power supply to the fixing device is stopped so that printer 50 shifts to the printing standby state. Fixing device temperature signal 43 outputted from image formation unit 24 is switched from the H level signal to the L level signal when the fixing device temperature falls to $T_c$–20 degrees C. ($t_{32}$ (FIG. 19)).

As mentioned above, the amount of load placed on CPU 63 for each print job on which the input editing processing is being executed in image processor 62 is calculated, and switching of the operation mode of CPU 63 is executed on the basis of the amount of load.

At Step S410, when determining that the operation mode of CPU 63 is the high speed mode, mode determination unit 64 determines that the switching of the operation mode of CPU 63 is unnecessary (Step S422). Then, printer 50 executes the processing after Step S413.

As mentioned above, printer 50 of the embodiment switches the CPU mode to either of the low speed mode, the medium speed mode, and the high speed mode depending on the state of image formation unit 24 as well as on the load of each print job and the processing state of the print job in image processor 24. Consequently, further reduction of the power consumption is attained.

While in each embodiment mentioned above, description has been given of a case where the image processing apparatus of the invention is applied to an electrophotographic printer, the image processing apparatus of the invention is not limited to this example. For example, the image processing apparatus of the invention can be applied to facsimiles, copying machines, multifunction machines, or the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image processing apparatus that processes image data on the basis of received data, the image processing apparatus comprising:
   a CPU operable on multiple CPU clocks;
   a selecting unit configured to select a first CPU clock on the basis of an operation mode of the image processing apparatus and processing state information on the image processing apparatus;
   a changing unit configured to change a second CPU clock to the first CPU clock selected by the selecting unit, wherein in a working mode the selecting unit selects the first clock, and in an energy-saving mode the selecting unit selects the second clock, the first clock being faster than the second clock;
   a formation unit that includes a fixing unit configured to fix an image on a medium by heating, wherein the changing unit changes the CPU clock based on temperature of the fixing unit.

2. The image processing apparatus of claim 1, further comprising a voltage changing unit configured to change an operating voltage of the CPU in association with the change to the second CPU clock.

3. The image processing apparatus of claim 1, further comprising a calculation unit configured to calculate an amount of load of the CPU based on received data and a load unit,
   wherein the changing unit changes the CPU clock and an operating voltage of the CPU based on the amount of load of the CPU.

4. The image processing apparatus of claim 1, wherein upon receiving image data, mode the frequency changing unit changes the operation frequency to the first frequency at a predetermined timing.

5. The image processing apparatus of claim 1, wherein upon receiving image data, the selecting unit selects the first clock at a predetermined timing.

6. The image processing apparatus of claim 4, wherein the predetermined timing is a timing when the fixing device temperature reaches a predetermined temperature range that is close to the fixing target temperature.

7. The image processing apparatus of claim 5, wherein the predetermined timing is a timing when the fixing device temperature reaches a predetermined temperature range that is close to the fixing target temperature.

8. An image processing apparatus that processes image data on the basis of received data, the image processing apparatus comprising:
- an input unit configured to receive image data;
- an edit-output unit comprising a CPU operable on multiple frequencies, the edit-output unit configured to edit the image data received to generate video data, and output the video data;
- a formation unit configured to form an image on a medium based on the video data output; and
- a frequency changing unit configured to change an operation frequency of the CPU based on the processing status of the formation unit, wherein when the edit-output unit is in a working mode the frequency changing unit changes the operation frequency to a first frequency, and when the edit-output unit is in an energy-saving mode the frequency changing unit changes the operation frequency to a second frequency, the first frequency being higher than the second frequency;
- wherein the formation unit includes a fixing unit configured to fix an image on a medium by heating and the frequency changing unit changes the operation frequency of the CPU based on temperature of the fixing unit.

9. The image processing apparatus of claim 8, further comprising a voltage changing unit configured to change an operating voltage of the CPU in the edit-output unit.

10. The image processing apparatus of claim 8, wherein
- the CPU operates at an operating frequency of any one of a high frequency and a low frequency;
- when brought into a state capable of forming the image, the formation unit outputs a capability notification signal for notification of the state, and
- the frequency changing unit switches the operating frequency to the high frequency on the basis of the capability notification signal.

11. The image processing apparatus of claim 8, wherein
- the CPU operates at an operating frequency of any one of a high frequency and a low frequency,
- the formation unit outputs a state notification signal for notification of the state of the formation unit to the frequency changing unit,
- the frequency changing unit includes:
  - a storage unit configured to store frequency information that indicates the operating frequency;
  - a judging unit configured to read the frequency information from the storage unit and judge whether the operating frequency is the high frequency upon receipt of the image data from the input unit;
  - a determination unit configured to determine whether or not to switch the operating frequency to the high frequency on the basis of the state notification signal when it is determined that the operating frequency is not the high frequency;
  - a frequency switching unit configured to switch the operating frequency to the high frequency when it is determined to switch the operating frequency to the high frequency; and
  - an updating unit configured to update the frequency information stored in the storage unit to the frequency information that indicates the high frequency, and
- the edit-output unit performs the output with the high frequency.

12. The image processing apparatus of claim 8, further comprising a calculation unit configured to calculate an amount of load of the edit-output unit that corresponds to the image data received by the input unit,
- wherein frequency changing unit changes the frequency of the CPU based on the amount of load of the edit-output unit calculated by the calculation unit.

13. The image processing apparatus of claim 10, further comprising a voltage changing unit configured to switch the operating voltage to a high voltage when the frequency changing unit switches the operating frequency to the high frequency.

14. The image processing apparatus of claim 11, wherein when the edit-output unit starts to output,
- the judging unit reads the frequency information from the storage unit to judge if the operating frequency is the high frequency,
- the frequency switching unit switches the operation frequency to the high frequency if the judging unit judges the operating frequency is not the high frequency,
- the updating unit updates the frequency information stored in the storage unit to the frequency information that indicates the high frequency,
- the edit-output unit continues to output operating based on the high frequency.

15. The image processing apparatus of claim 12, further comprising a voltage changing unit configured to change an operating voltage of the edit-output unit.

16. The image processing apparatus of claim 14, wherein when the edit-output unit completes output, the frequency changing unit changes the operating frequency to the low frequency, and the updating unit updates the frequency information stored in the storage unit to the frequency information that indicates the low frequency.

17. The image processing apparatus of claim 12, wherein the calculation unit calculates an amount of load on the basis of resolution of the image data.

18. The image processing apparatus of claim 12, wherein the calculation unit calculates an amount of load on the basis of a type of a description language in which the image data is described.

19. The image processing apparatus of claim 12, wherein
- the image processing apparatus can communicate with a higher level device,
- the input unit includes a receiver configured to receive the image data from a higher level device, and
- the calculation unit calculates an amount of load on the basis of a type of the receiver.

20. An image processing apparatus that processes image data on the basis of received data, the imam processing apparatus comprising:
- an input unit configured to receive image data;
- an edit-output unit comprising a CPU operable on multiple frequencies, the edit-output unit configured to edit the image data received to generate video data, and output the video data;
- a formation unit configured to form an image on a medium based on the video data output; and
- a frequency changing unit configured to change an operation frequency of the CPU based on the processing status of the formation unit, wherein when the edit-output unit is in a working mode the frequency changing unit changes the operation frequency to a first frequency, and when the edit-output unit is in an energy-saving mode the frequency changing unit changes the operation frequency to a second frequency, the first frequency being higher than the second frequency;

the CPU operates at an operating frequency of any one of a high frequency and a low frequency;

when brought into a state capable of forming the image, the formation unit outputs a capability notification signal for notification of the state, and the frequency changing unit switches the operating frequency to the high frequency on the basis of the capability notification signal; and the formation unit includes a fixing device configured to apply heat to the image and fixes the image onto the medium, the formation unit outputting the capability notification signal when a fixing device temperature of the fixing device is within a predetermined temperature range.

21. An image processing apparatus that processes image data on the basis of received data, the image processing apparatus comprising:

an input unit configured to receive image data;

an edit-output unit comprising a CPU operable on multiple frequencies, the edit-output unit configured to edit the image data received to generate video data, and output the video data;

a formation unit configured to form an image on a medium based on the video data output; and a frequency changing unit configured to change an operation frequency of the CPU based on the processing status of the formation unit, wherein when the edit-output unit is in a working mode the frequency changing unit changes the operation frequency to a first frequency, and when the edit-output unit is in an energy-saving mode the frequency changing unit changes the operation frequency to a second frequency, the first frequency being higher than the second frequency; wherein when brought into a state incapable of forming the image, the formation unit outputs an incapability notification signal for notification of the state to the frequency changing unit, and the frequency changing unit switches the operating frequency to the low frequency on the basis of the incapability notification signal.

22. The image processing apparatus of claim 21, wherein the formation unit includes a fixing device configured to apply heat to the image and fixes the image onto the medium, and the formation unit outputs the incapability notification signal when a fixing device temperature of the fixing device is out of a predetermined temperature range.

23. The image processing apparatus of claim 21, further comprising a voltage changing unit configured to switch the operating voltage to a low voltage when the frequency changing unit switches the operating frequency to the low frequency.

* * * * *